United States Patent
Schroeder et al.

(10) Patent No.: US 6,829,348 B1
(45) Date of Patent: Dec. 7, 2004

(54) SYSTEM FOR CUSTOMER CONTACT INFORMATION MANAGEMENT AND METHODS FOR USING SAME

(75) Inventors: Kim A. Schroeder, Murray, UT (US); Aaron Jenkins, Kaysville, UT (US); Keric P. Donnelly, Salt Lake City, UT (US); Greyson Smith, Salt Lake, UT (US); Shawn Anderson, Draper, UT (US)

(73) Assignee: Convergys CMG Utah, Inc., South Jordan, UT (US)

( * ) Notice: Subject to any disclaimer, the term of this patent is extended or adjusted under 35 U.S.C. 154(b) by 0 days.

(21) Appl. No.: 09/559,837

(22) Filed: Apr. 26, 2000

Related U.S. Application Data

(60) Provisional application No. 60/146,515, filed on Jul. 30, 1999.

(51) Int. Cl.[7] .............................................. H04M 3/00
(52) U.S. Cl. ........................... 379/265.09; 379/265.02; 379/265.03; 379/265.04
(58) Field of Search ................... 379/265.02, 265.03, 379/265.04, 265.06, 265.09, 88.17, 900; 713/182; 370/352, 353, 354, 355, 356

(56) References Cited

U.S. PATENT DOCUMENTS

| | | | | |
|---|---|---|---|---|
| 5,465,286 A | * | 11/1995 | Clare et al. ............... | 379/32.04 |
| 5,727,163 A | | 3/1998 | Bezos ........................ | 395/227 |
| 5,734,823 A | | 3/1998 | Saigh et al. ............ | 395/200.06 |
| 5,748,711 A | | 5/1998 | Scherer .................... | 379/91.02 |
| 5,790,790 A | | 8/1998 | Smith et al. ........... | 395/200.36 |
| 5,794,207 A | | 8/1998 | Walker et al. ................ | 705/23 |
| 5,796,729 A | | 8/1998 | Greaney et al. ............ | 370/455 |
| 5,809,242 A | | 9/1998 | Shaw et al. ............. | 395/200.47 |
| 5,812,784 A | * | 9/1998 | Watson et al. .............. | 709/227 |
| 5,819,260 A | | 10/1998 | Lu et al. ........................ | 707/3 |
| 5,848,397 A | | 12/1998 | Marsh et al. ................. | 705/14 |
| 5,867,495 A | | 2/1999 | Elliott et al. ................ | 370/352 |
| 5,883,891 A | | 3/1999 | Williams et al. ............ | 370/356 |
| 5,884,032 A | * | 3/1999 | Bateman et al. ............ | 709/204 |
| 5,910,946 A | | 6/1999 | Csapo ........................ | 370/328 |
| 5,917,903 A | | 6/1999 | Jolissaint .................... | 379/265 |
| 5,958,007 A | | 9/1999 | Lee et al. .................... | 709/219 |
| 5,963,551 A | | 10/1999 | Minko ........................ | 370/356 |
| 5,987,116 A | * | 11/1999 | Petrunka et al. ........ | 379/265.13 |
| 5,991,390 A | * | 11/1999 | Booton .................. | 379/265.02 |
| 5,999,932 A | | 12/1999 | Paul ............................. | 707/10 |
| 6,055,307 A | * | 4/2000 | Behnke et al. ......... | 379/265.14 |
| 6,058,163 A | * | 5/2000 | Pattison et al. ........ | 379/265.06 |
| 6,088,799 A | * | 7/2000 | Morgan et al. ............. | 713/182 |
| 6,377,567 B1 | * | 4/2002 | Leonard ..................... | 370/352 |
| 6,480,598 B1 | * | 11/2002 | Reding et al. ......... | 379/265.01 |
| 6,490,350 B2 | * | 12/2002 | McDuff et al. ........ | 379/265.06 |
| 6,665,395 B1 | * | 12/2003 | Busey et al. ........... | 379/265.09 |

* cited by examiner

*Primary Examiner*—Bing Q. Bui
(74) *Attorney, Agent, or Firm*—Frost Brown Todd LLC

(57) ABSTRACT

The present invention is directed toward a system and method for providing complete customer contact management across a variety of customer contact channels so that businesses, or clients (i.e., those businesses using the services of the system and method of the present invention), can manage and develop relationships with their customers. In one example, the present invention provides an efficient way in which clients can obtain information from the various customer contact channels and use this information to, for example, increase sales and enhance business productivity. In another example, the present invention provides a useful mechanism by which clients can monitor customers' preferences for products or services, so that the client can develop new products and services or modify existing products and services to meet the demand of the customers. The present invention also provides an improved system capable of retrieving customer contact information from a plurality of contact channels, storing, that information, and performing subsequent processes, such as making the data available to the clients in the form of, for example, reports.

18 Claims, 21 Drawing Sheets

| Message_ID | Record_Create_datetime | Customer_ID | Email_Addr | First_Name | Last_Name | Type | Case_No | DateTime_Rec'd | DateTime_Compt | Orig_Subject | Orig_Email_SubjectBody | Reply_Subject | Reply_Email body | NoteHasAttachment | Mailbox | Folder_Name | Completed? |
|---|---|---|---|---|---|---|---|---|---|---|---|---|---|---|---|---|---|
| ††† | ††† | ††† | ††† | ††† | ††† | ††† | ††† | ††† | ††† | ††† | ††† | ††† | ††† | ††† | ††† | ††† | ††† |
| 445 | 01/21/99 | 34345 | Smith@x.com | Jim | Smith | Incoming msg | 41 | 4/14/99 4:54:14 | 4/14/99 5:00:25 | Goods | Compliant about Goods | Warranty | Describe Warranty | NA | 1 (Yes) | agent 1 picks @email.com | 1 (Yes) |
| ††† | ††† | ††† | ††† | ††† | ††† | ††† | ††† | ††† | ††† | ††† | ††† | ††† | ††† | ††† | ††† | ††† | ††† |
| ††† | ††† | ††† | ††† | ††† | ††† | ††† | ††† | ††† | ††† | ††† | ††† | ††† | ††† | ††† | ††† | ††† | ††† |

FIG. 1B

SYSTEM FOR CUSTOMER CONTACT INFORMATION MANAGEMENT AND METHODS FOR USING SAME

The present application claims priority under 35 U.S.C. § 119(e) to provisional application 60/146,515, filed Jul. 30, 1999, the entirety of which is incorporated herein by reference.

BACKGROUND TO THE INVENTION

1. Field of the Invention

The present invention relates generally to managing customer contact information. Particularly, the present invention relates to a contact information management system for receiving and reporting customer contact information received from a plurality of customer contact sources, such as, but not limited to, hard copy correspondence, telephone, facsimile, the Internet, and electronic messages. More particularly, the present invention relates to receiving, storing, managing, and tracking customer contact information, and to responding to customers' queries about the contact information or other products or services.

2. Related Art

Customer contact management, including conventional customer service functions, has traditionally been provided in two forms: "in-house," wherein the company performs customer service itself, and outsourced customer service operations, wherein an entity other than the company provides customer service functionality to the company. Conventional outsourced customer management operations have generally provided such services as outsourced telemarketing and traditional customer service operations between customers and clients. "Clients" referring to those companies employing the outsource-based customer management operations.

Conventional outsourced customer service operations have focused predominantly upon the management of call center facilities. With the growth of new modes of communication between customers and clients, such as the Internet and electronic mail (e-mail) communications, the utility of such call center facilities has become limited. Moreover, conventional systems have not provided, for example, a convenient means by which to accumulate, store, and report customer contact information, which is received via the various modes of communication, to clients in an efficient and user-friendly manner.

Moreover, conventional systems have not been successful in providing a cost-efficient and simple method for overall management of the contact information received from a variety of contact sources, such as telephone, e-mail, facsimile, hard-copy correspondence, and Internet-based contacts. Moreover, these attempts have not been successful in providing automated processes for handling the contact information which has resulted in either the same, or higher, number of agents required to fulfill the needs of the customer contact management system.

There is a need for a system and method that provides a complete history of customer contact from all customer contact channels. There is a further need to allow agents to be able to access the complete customer contact information history when in contact with a customer via any one of the customer contact channels. There is yet another need to allow agents to update the contact history during and after a contact without being interrupted by another contact. There is a further need to automatically update the contact information history either during or after a contact. An additional need exists for an integrated system and method for reporting the complete customer contact history and the work performance of agents to a client. A need also exists for an integrated system and method for monitoring the performance of agents on customer contacts received via all modes of communication. In addition, a need exists for an agent to be able to simultaneously log on to multiple subsystems of a communication system.

SUMMARY OF THE INVENTION

The present invention provides a system and method that satisfies one or more of the aforementioned needs.

The present invention relates to a contact information management system. In one example, the system includes a first means for receiving contact information from a first contact channel and a second means for receiving contact information from a second contact channel. The second contact channel may be different from the first contact channel. A first database is also included and is configured to receive the contact information from the first and the second means for receiving contact information. A second database is also included and is configured to receive the contact information in the first database. Also included is a means for transferring the contact information in the first database to the second database.

The present invention also relates to a method for managing contact information. In one example, the method includes receiving contact information from a first contact channel, receiving contact information from a second contact channel, storing the contact information from the first contact channel and the second contact channel in a first database, and transferring the contact information stored in the first database to a second database.

In another example, the present invention relates to a system for managing contact information. The system includes a memory device having embodied therein program code and a processor in communication with the memory device. The processor is preferably configured by the program code for receiving contact information from a first contact channel, receiving contact information from a second contact channel, storing the contact information from the first contact channel and the second contact channel in a first database, and transferring the contact information stored in the first database to a second database.

The present invention also relates to a computer program product including a computer useable medium having computer program logic recorded thereon for enabling a processor in a computer system to facilitate managing contact information. The computer program logic includes: first receiving means for enabling the processor to receive contact information from a first contact channel; second receiving means for enabling the processor to receive contact information from a second contact channel; storing means for enabling the processor to store the contact information from the first contact channel and the second contact channel in a first database; and transferring means for enabling the processor to transfer the contact information stored in the first database to a second database.

In another example, the present invention relates to a system for managing at least two types of contact information. The system includes a server for receiving contact information from a first contact channel. The system also includes a call center for receiving contact information from a second contact channel and a first database configured to store the contact information from the server and the call center.

The present invention also relates to a method for managing at least two types of contact information. The method includes receiving contact information at a server from a first contact channel and receiving contact information at a call center from a second contact channel. The method also includes storing the contact information from the server and the call center in a first database.

In another example, the present invention relates to a system for managing at least two types of contact information. The system includes a memory device having embodied therein program code and a processor in communication with the memory device. The processor is preferably configured by the program code for receiving contact information at a server from a first contact channel, receiving contact information at a call center from a second contact channel, and storing the contact information from the server and the call center in a first database.

The present invention also relates to a computer program product comprising a computer useable medium having computer program logic recorded thereon for enabling a processor in a computer system to facilitate management of contact information. The computer program logic includes: first receiving means for enabling the processor to receive contact information at a server from a first contact channel; second receiving means for enabling the processor to receive contact information at a call center from a second contact channel; and storing means for enabling the processor to store the contact information from the server and the call center in a first database.

In another example, the present invention relates to a contact information system. The system includes an electronic communications server configured to receive electronic communications contact information from a contact channel. The system also includes a first database in data communication with the electronic communications server and a second database in data communication with the first database. Also included is a computer program configured for transmitting the electronic communications contact information from the electronic communications server to the first database; formatting the electronic communications contact information in the first database; and transferring the electronic communications contact information in the first database to the second database.

The present invention also relates to a method for receiving electronic communications contact information from a contact channel. The method includes transmitting the electronic communications contact information from an electronic communications server to a first database and formatting the electronic communications contact information in the first database. The method also includes transferring the electronic communications contact information in the first database to a second database.

In another example, the present invention relates to a computer program product comprising a computer useable medium having computer program logic recorded thereon for enabling a processor in a computer system to manage electronic communications contact information. The computer program logic includes: transmitting means for enabling the processor to transmit the electronic communications contact information from an electronic communications server to a first database; formatting means for enabling the processor to format the electronic communications contact information in the first database; and transferring means for enabling the processor to transfer the electronic communications contact information in the first database to a second database.

The present invention also relates to a system for receiving electronic communications contact information from a contact channel. The system includes a memory device having embodied therein program code and a processor in communication with the memory device. The processor is preferably configured by the program code for transmitting the electronic communications contact information from an electronic communications server to a first database, formatting the electronic communications contact information in the first database, and transferring the electronic communications contact information in the first database to a second database.

In another example, the present invention relates to a communications system. The system includes a data link configured to connect the communications system to a contact channel associated with the communications system. The system also includes a first database configured to receive telephone communications contact information from the contact channel. Also included is a computer program configured for formatting the telephone communications contact information in the first database and transferring the telephone communications contact information in the first database to a second database, wherein the second database comprises the telephone communications contact information and at least one additional type of contact information.

The present invention also relates to a method for managing contact information. The method includes: receiving contact information in a first database; transferring the contact information to a second database; formatting the contact information in the second database; and transferring the contact information in the second database to a third database, wherein the third database comprises at least one additional type of contact information.

In another example, the present invention relates to a communications system for receiving at least two types of contacts. The system includes an agent computer in electronic communication with a database, the database configured for receiving the at least two types of contacts, and an agent telephone in electronic communication with the agent computer. Also included is a computer program including a graphical user interface, wherein the graphical user interface is configured to enable an agent to use the agent computer to control the agent telephone.

The present invention also relates to a system for handling calls to a call center. The system includes an agent telephone adapted to be used by an agent to answer said calls and an agent terminal adapted to display information regarding a current one of said calls, the agent terminal including an input device. Also included is a computer program operating at the agent terminal, the computer program configured to place the agent terminal and the agent telephone in an operating mode of a not ready to receive a new call mode or a ready to receive a new call mode.

In another example, the present invention relates to a method for handling calls to a call center. The method includes providing an agent telephone and an agent terminal including an input device and using the input device to place the agent terminal and the agent telephone in an operating mode which is a not ready to receive a new call mode or a ready to receive a new call mode. The method further includes routing a new call to the agent terminal and the agent telephone when the agent terminal and the agent telephone are in the ready to receive a new call mode and displaying information regarding the new call on the agent terminal.

The present invention also relates to a system for handling calls to a call center. The system includes a memory device having embodied therein program code and a processor in communication with the memory device. The processor may be configured by the program code for placing an agent terminal and an agent telephone in an operating mode which is a not ready to receive a new call mode or a ready to receive a new call mode and routing a new call to the agent terminal and the agent telephone when the agent terminal and the agent telephone are in the ready to receive a new call mode. In addition, the processor may be further configured for displaying information regarding the new call on the agent terminal.

In another example, the present invention relates to a computer program product comprising a computer useable medium having computer program logic recorded thereon for enabling a processor in a computer system to manage a plurality of calls to a call center. The computer program logic includes: placing means for enabling the processor to place an agent terminal and an agent telephone in an operating mode which is a not ready to receive a new call mode or a ready to receive a new call mode; routing means for enabling the processor to route a new call to the agent terminal and the agent telephone when the agent terminal and the agent telephone are in the ready to receive a new call mode; and displaying means for enabling the processor to display information regarding the new call on the agent terminal.

The present invention also relates to a reporting system adapted for use in a customer communications system. The system includes a computer system configured to collect contact information from at least two customer contact channels and to store the contact information in a first database. The system also includes a second database in communication with the first database, the second database configured to store the contact information received by the computer system in the first database. The system also includes a third database in communication with the second database. The third database may be configured to store the contact information, and it is preferably configured to enable reports to be generated based on the contact information.

In another example, the present invention relates to a method for reporting contact information obtained from at least two types of customer contact channels. The method includes collecting the contact information and automatically storing the contact information. The method further includes enabling a client system to query the contact information and generating a report based on the contact information.

The present invention also relates to a system for reporting contact information obtained from at least two types of customer contact channels. The system includes a memory device having embodied therein program code and a processor in communication with the memory device. The processor is configured by the program code for collecting the contact information and automatically storing the contact information. The processor is further configured for enabling a client system to query the contact information and generating a report based on the contact information.

In another example, the present invention relates to a computer program product comprising a computer useable medium having computer program logic recorded thereon for reporting contact information obtained from at least two types of customer contact channels. The computer program logic includes: collecting means for enabling the processor to collect the contact information; automatically storing means for enabling the processor to automatically store the contact information; enabling means for enabling the processor to enable a client system to query the contact information; and generating means for enabling the processor to generate a report based on the contact information.

The present invention also relates to a method for receiving contact information obtained from at least two types of customer contact channels. The method includes accumulating the contact information in a first database at periodic intervals and transferring the contact information to a second database in electronic communication with the first database. The method further includes formatting the contact information in the second database to produce formatted contact information and transferring the formatted contact information in the second database to a third database, so that the third database includes contact information collected from the at least two types of contact channels.

In another example, the present invention relates to a system for collecting contact information obtained from at least two types of contact channels. The system includes a memory device having embodied therein program code and a processor in communication with the memory device. The processor is configured for accumulating the contact information in a first database at periodic intervals and transferring the contact information to a second database associated with the first database. The processor is further configured for: formatting the contact information in the second database to produce formatted contact information and transferring the formatted contact information in the second database to a third database, so that the third database comprises contact information obtained from at least two types of contact channels.

The present invention also relates to a computer program product comprising a computer useable medium having computer program logic recorded thereon for collecting contact information obtained from at least two types of contact channels. The computer program logic includes: accumulating means for enabling the processor to accumulate contact information in a first database at periodic intervals; transferring means for enabling the processor to transfer the contact information to a second database associated with the first database; formatting means for enabling the processor to format the contact information in the second database to produce formatted contact information; and transferring means for enabling the processor to transfer the formatted contact information in the second database to a third database, so that the third database comprises the contact information obtained from at least two types of contact channels.

In another example, the present invention relates to a method for reporting customer contact information from a plurality of customer contact channels. The method includes accumulating the customer contact information received from the plurality of customer contact channels and arranging the customer contact information into a predetermined format to produce formatted customer contact information. The method also includes storing the formatted customer contact information in a first memory storage area and extracting the customer contact information from the first memory storage area to produce extracted customer contact information.

The present invention also relates to a system for reporting customer contact information from a plurality of customer contact channels. The system includes a memory device having embodied therein information relating to customer contacts and a processor in communication with the memory device. The processor is configured for accumulating the customer contact information received from the plurality of customer contact channels and arranging the customer contact information into a predetermined format to produce formatted customer contact information. The processor is further configured for storing the customer contact information in a first memory storage area and extracting the customer contact information from the first memory storage area to produce extracted customer contact information.

In another example, the present invention relates to a computer program product including a computer useable medium having computer program logic recorded thereon for reporting customer contact information from a plurality of customer contact channels. The computer program logic including: accumulating means for enabling the processor to accumulate the customer contact information received from the plurality of customer contact channels; arranging means for enabling the processor to arrange the customer contact information in a predetermined format to produce formatted customer contact information; transferring means for enabling the processor to transfer the formatted customer contact information to a first memory storage area; extracting means for enabling the processor to extract the customer contact information from the first memory storage area to produce extracted customer contact information; and generating means for enabling the processor to generate a report based on the customer contact information.

The present invention also relates to a method for enabling an agent to log onto a customer service system where the customer service system comprises a plurality of subsystems, each having a separate log on procedure. The method includes prompting an agent at an agent terminal for login data. The method further includes receiving the login data entered by the agent and transmitting the login data to each of the plurality of subsystems, whereby the agent is logged on to each of the plurality of subsystems.

FEATURES AND ADVANTAGES

The invention provides an efficient and simple method and system for managing customer contact information. Particularly, the invention provides a means for receiving and reporting the complete history of customer contacts from a plurality of customer contact channels or sources.

The invention also allows agents the ability to access the complete customer contact information history while in contact with a customer via any one of the customer contact channels.

An advantage of the present invention is that agents can update the contact information history during and after a contact with a customer without being interrupted by another contact. Alternatively, the invention allows the contact information history to automatically update either during or after a contact with a customer.

An additional advantage of the present invention is that it provides an integrated system and method for reporting the complete customer contact history and the work performance of agents to a client. The integrated system and method can also be used for monitoring the performance of agents on all customer contact channels.

A further advantage of the present invention is that an agent can simultaneously log onto multiple subsystems of the communication system of the present invention.

Additional features and advantages of the invention will be set forth in the description that follows, and others will be apparent from the description or may be learned in practice of the invention.

BRIEF DESCRIPTION OF THE DRAWINGS

The accompanying drawings, which are incorporated in and constitute a part of this specification, illustrate embodiments of the invention and, together with the description, serve to explain the features, advantages, and principles of the invention.

FIG. 1B illustrates an exemplary data format of an exemplary staging table of the present invention;

DETAILED DESCRIPTION OF THE PREFERRED EMBODIMENTS

Figure 1A:
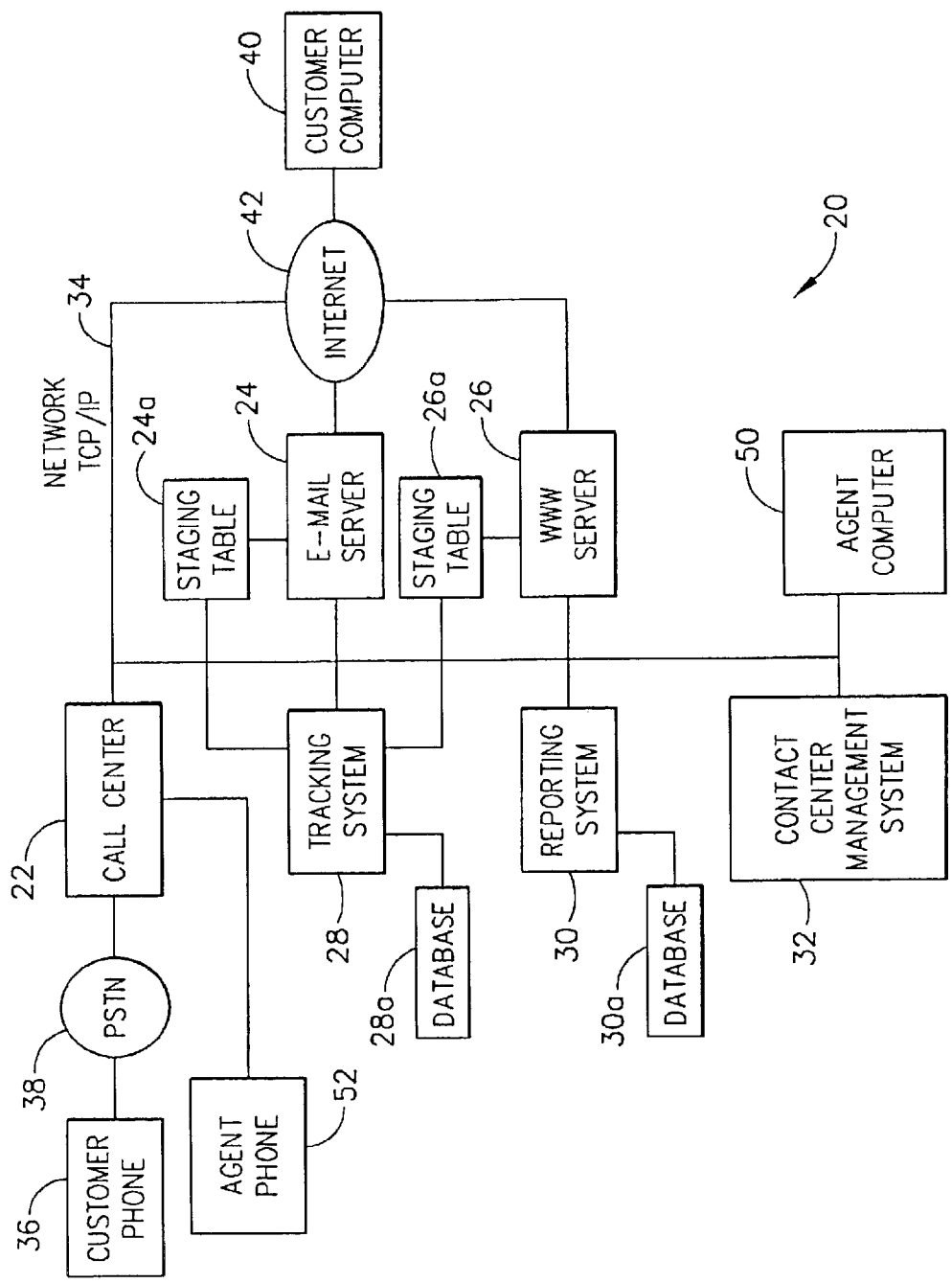
FIG. 1A illustrates an exemplary embodiment of a customer contact information management system of the present invention.

Reference will now be made in detail to the present preferred embodiments of the invention, examples of which are illustrated in the accompanying drawings. The exemplary embodiment of this invention is shown in some detail, although it will be apparent to those skilled in the relevant art that some features may not be shown for the sake of clarity.

Overview

The modes of communication between customers and businesses have changed dramatically in recent years. These modes of communication are referred to herein as customer contact channels or customer contact sources. The public telephone system and hard copy correspondence, e.g., U.S. mail and facsimile, are still primary means by which a customer can contact an agent of a business, including customer service representatives ("CSR's"). However, home computers and the Internet have added at least two increasingly important customer contact channels or contact sources. These channels are electronic mail, or e-mail and Internet-based contacts.

The Internet has provided a cost-effective forum for businesses to interact with customers. In particular, a World Wide Web (WWW) server enables a business to provide a site on the Internet describing its products and services. In addition, a WWW server may be used to create a site for customers to order products and services. A WWW server typically has the capability to store and transfer Hypertext Markup Language (HTML) files, multimedia content, and other scripts. A customer can visit the site via the Internet using a computer configured with Web browser software. The Web browser may communicate with the Web server using Hypertext Transfer Protocol (HTTP).

Despite the information available via the Internet and other media forms, customers may require other assistance from the business. Accordingly, in accordance with the present invention, a business may provide customers with telephone numbers, e-mail addresses, and web-based forms so customers can submit queries to agents. In order for an agent to effectively and efficiently assist a customer, the agent preferably has ready access to information about the customer, the subject of the query, and the contact history between the business and the customer. In addition, the agent is preferably enabled to update the business's records with information learned during the contact that is relevant to the above topics.

The present invention is directed toward a system and method for providing complete customer contact management across a variety of customer contact channels so that businesses, or clients (i.e., those businesses using the services of the system and method of the present invention), can manage and develop relationships with their customers. In one example, the present invention provides an efficient way in which clients can obtain information from the various customer contact channels and use this information to, for example, increase sales and enhance business productivity. In another example, the present invention provides a useful mechanism by which clients can monitor customers' preferences for products or services so that the client can develop new products and services or modify existing products and services to meet the demand of the customers. The present invention also provides an improved system capable of retrieving customer contact information from a plurality of contact channels, storing that information, and performing subsequent processes, such as making the data available to the clients in the form of, for example, reports.

The foregoing overview is provided to help understand the nature and essence of the present invention. The overview is not intended to be limiting as to the scope of the present invention in any way.

System and Method of the Present Invention

Referring to FIG. 1A there is shown an exemplary embodiment of a customer contact information management system 20 of the present invention. Customer contact information management system 20 is preferably directed to a system for, but not limited to, receiving, storing, managing, tracking, and responding to customer contacts, which are received via a plurality of customer contact channels, including, but not limited to, telephone, the Internet, e-mail, or hard copy correspondence received via courier or facsimile.

System 20 preferably includes a call center 22, an electronic mail or e-mail server 24, a World Wide Web (WWW) server 26, a tracking system 28 including a first database 28a, a reporting system 30 including a second database 30a, an agent terminal, which can alternatively be referred to as agent computer 50, and an agent telephone 52. Each of the aforementioned components of system 20 will be described in more detail below.

In one embodiment of the present invention, call center 22, e-mail server 24, WWW server 26, tracking system 28 including first database 28a, reporting system 30 including second database 30a, contact center management system 32, agent computer 50, and agent telephone 52 are connected via a network 34. Network 34 may be an Ethernet network that utilizes TCP/IP. However, it should be apparent to one of ordinary skill in the art that system 20 may utilize a variety of different types of networks and a variety of different types of data transfer protocols. Those skilled in the art should also recognize that the network 34 may be part of a local area network (LAN) or wide area network (WAN).

As is known in the art, a LAN preferably comprises a computer network that spans a relatively small geographical area. For example, conventional LANs are confined to a single building or group of buildings. However, a single LAN can be connected to other LANs over any distance via, for example, but not limited to, telephone lines and radio waves. A system of LANs connected in this way is generally referred to as a WAN.

A WAN is generally described as a computer network that spans a relatively large geographical area. Computers connected to a WAN are often connected through public networks, such as, but not limited to, the telephone system or the Internet. These computers can also be connected through, for example, but not limited to, leased lines or satellites.

In an exemplary embodiment of the present invention, call center 22, electronic mail or e-mail server 24, WWW server 26, tracking system 28, reporting system 30, agent computer 50 and agent telephone 52 which comprise system 20 can be referred to as a transaction-processing center. In an exemplary embodiment of the present invention, a plurality of agent computers 50 and agent telephones 52 are located within the transaction-processing center. It should be understood by one of ordinary skill in the art, that a transaction-processing center of the present invention may comprise a plurality of buildings and rooms each comprising agent computers 50 and agent telephones 52. In this sense, agent computer 50 and agent telephone 52 can be referred to as "local" to the transaction-processing center, or alternatively, as "local" system 20. In another exemplary embodiment of the present invention, agent computer 50 and agent telephone 52 can be remotely located from the primary facility of the system 20. Such a site for the location of agent computer 50 and/or agent telephone 52 could include, but is not limited to, the agent's home, another facility, or any other suitable location. It should be understood that agent computer 50 does not have to be at the same location as agent telephone 52. For example, agent telephone 52 could be located at the agent's home and agent computer 50 could be located in another suitable location within the transaction processing center. The agent would preferably have a monitor, terminal, or display for displaying data received from agent computer 50. In embodiments having at least the agent telephone 52 outside of the primary facility of the system 20, the agent would be considered to be "remote" from transaction-processing center or system 20. In other words, the agent would be "a remote agent." The remote agent functionality can be carried out using conventional techniques well known to those of ordinary skill in the art. For example, systems for carrying out such functionality are described in more detail in U.S. Pat. Nos. 5,073,890; 5,291, 551; 5,392,345; 5,459,780; 5,778,060; 5,878,130; 5,802, 163; and 5,684,870 the entirety of each of which are herein incorporated by reference in their entirety.

In an exemplary embodiment of the present invention, system 20 is configured to provide customer service for products or services, information regarding products or services for sale, or a variety of other types of information or services.

In an exemplary embodiment, customers may contact system 20 by a telephone call, an electronic message, an Internet-based contact, for example, but not limited to, Internet chat or an HTML file submitted via a client's Web site, or hard copy correspondence. In a particular embodiment, a customer can use a telephone 36 to place a telephone call to call center 22 via a public switched telephone network (PSTN) 38. In addition, a customer having a computer 40 can contact system 20 via the Internet 42. In an exemplary embodiment, the customer can send an e-mail message to electronic message server 24 using an e-mail program, for example, Eudora®, a registered trademark of Qualcomm Incorporated, San Diego, Calif., which is loaded on computer 40. Alternatively, the customer can contact WWW server 26 if computer 40 is configured with a WWW browser, which is a known software tool used to access the servers of the network. Each of these exemplary contact methods will be described in more detail below.

Representative WWW browsers suitable for use in the present invention include, but are not limited to, Netscape Navigator® (all versions), a registered trademark of Netscape Communications Corporation, Mountain View, Calif., and Microsoft Internet Explorer® (all versions), a registered trademark of Microsoft Corporation, Redmond, Washington, or the like, each of which are "off-the-shelf or downloadable software programs. The WWW server platform (sometimes referred to as a "Web" site) supports files in the form of hypertext documents and objects. In the Internet paradigm a network path to a server is identified by a so-called Uniform Resource Locator (URL). The World Wide Web is the Internet's multimedia information retrieval system. In particular, it is a collection of servers on the Internet that use the Hypertext Transfer Protocol (HTTP), which provides users access to files using Hypertext Markup Language (HTML).

As shown in FIG. 1A system 20 also preferably includes a contact center management system 32. Contact center management system 32 is configured to manage customer contacts. In an exemplary embodiment, contact center management system 32 is a system comprising at least one programmed computer that is configured to receive and track contact data files and/or documents which are then prioritized and distributed to agents, preferably online, for processing. For example, a desired agent may be an agent who is designated as currently available, an agent that has extensive knowledge about a particular area, or an agent's supervisor. Contact center management system 32 may also be programmed to perform other functions such as, but not limited to, the scheduling of agents, agent timekeeping, the monitoring of contact quality, and the pricing schedule.

In the exemplary embodiment of FIG. 1A, call center 22, e-mail server 24, WWW server 26, and contact center management system 32 comprise what is preferably referred to as a "contact center." As used herein, unless otherwise clear from the context, a contact center shall be understood to include, but is not limited to, the devices, programs, subsystems, and/or other means by which customer contacts are received and managed. It should be understood by one of ordinary skill in the art that an exemplary contact center of the present invention may be adapted to receive, but is not limited to receiving, telephone calls, electronic communications, and/or hard copy correspondence. The electronic communications can include, but are not limited to, electronic mail messages and/or other types of electronic messages, including, for example, Internet-based contacts such as Internet chat or an HTML file submitted via a client's web site.

Figure 2:
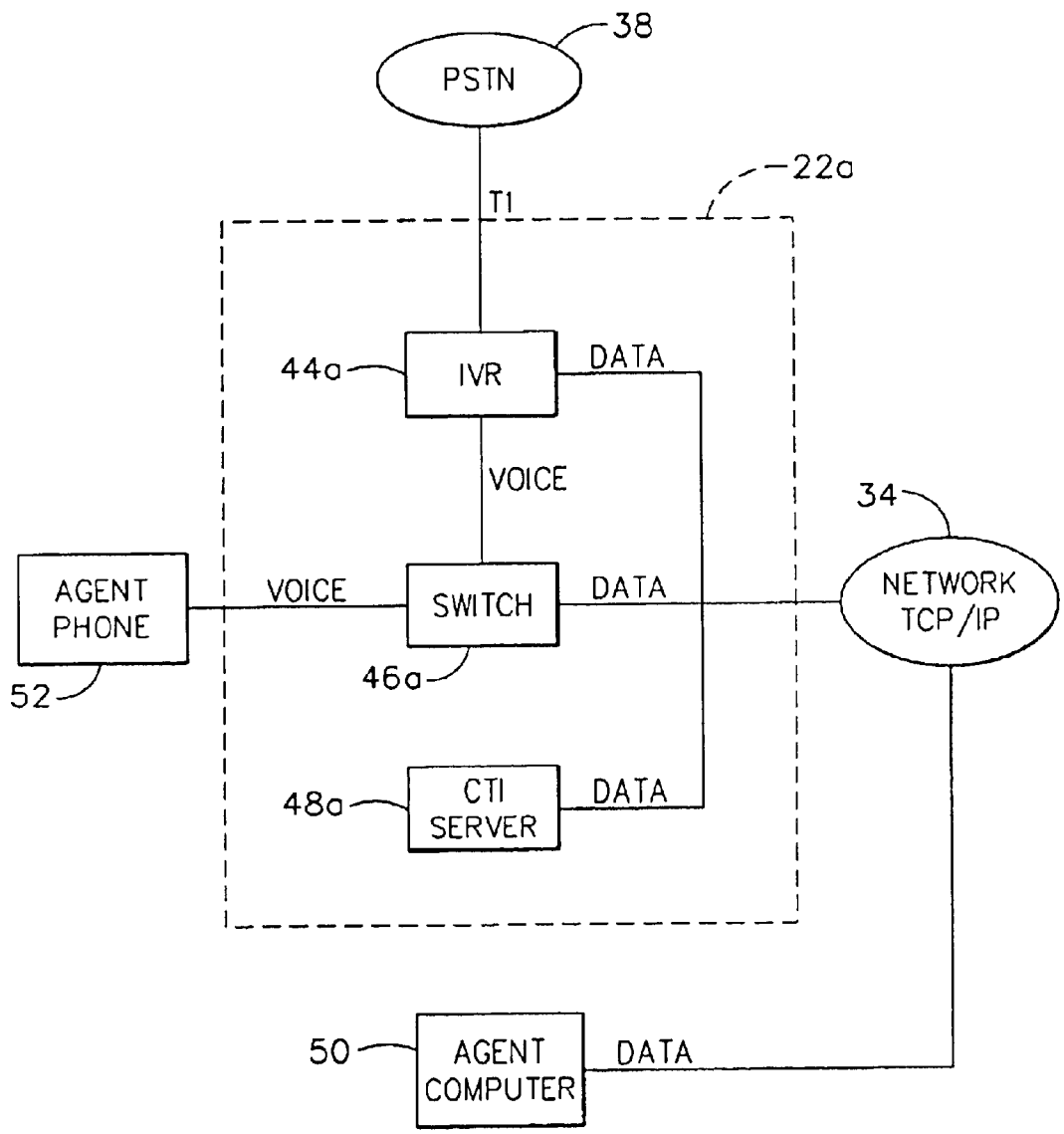
FIG. 2 illustrates an exemplary embodiment of a call center of the present invention.

Call center 22 of system 20 can have many embodiments suitable for use in the present invention. Referring to FIG. 2, there is shown one exemplary embodiment 22a of call center 22. Call center 22a preferably includes an Interactive Voice Response (IVR) system 44a on the front end of a switch or Private Branch Exchange (PBX) 46a. A preferred embodiment of the switch 46a is a Lucent Definity G3, an Aspect switch, an AT&T/OCDD switch, or a Nortel/Max switch. IVR system 44a is preferably coupled to public switch telephone network (PSTN) 38 by a T1 line. As is known in the art, a T1 line describes a point-to-point digital communications circuit that carries twenty-four (24) 64,000-bits/second (though sometimes only 56,000 bits/second are accessible to end users) channels, each of which may be used for data or digitized voice. As shown in FIG. 2, IVR system 44a, switch 46a and a Computer Telephony Integration (CTI) server 48a(described in more detail below with respect to FIGS. 3 and 4) are each preferably connected to network 34.

Through the integration of CTI server 48a, IVR system 44a, agent computer 50, and agent telephone 52, it is possible for agents to initiate automatic applications on agent computer 50 based on the telephone call that they receive from a customer. If the customer has identified himself or herself with a personal identifier, such as, but not limited to, a client number, all of the customer information, for example, but not limited to, whether the client has called previously, if so why, how often, and the answers that have been given to specific questions can be accessed and displayed on the agent computer 50. In this way, conversations can be conducted more effectively and quickly, raising the quality and productivity of the service.

In operation, when a telephone call is received from a customer, IVR system 44a accessed prior to switch 46a preferably provides the customer with a list of options for advancing the call. For example, IVR system 44a may ask whether the call concerns an order, a request for product information, or a request for technical support. After the customer selects an option for advancing the call, switch 46a routes the call, based on the customer's selection, to an available and suitable agent having agent telephone 52. At about the same time, CTI server 48a will pass data from IVR system 44a over network 34 to agent computer 50 which causes a screen pop of desired customer information on the monitor of the available agent's computer 50. Agent computer 50 is also preferably coupled to network 34. As shown in FIG. 2, voice data can be passed between switch 46a and agent telephone 52. Other forms of data, including, but not limited to, a customer identifier, the automatic number identification (ANI), dialed number identification service (DNIS), an order number, a company identification code (CIC), and the exit point from IVR system 44a, can be sent over network 34 and between each of IVR 44a, switch 46a, CTI server 48a, and agent computer 50.

A screen pop, as used herein, refers to displaying information pertaining to the customer contact on the terminal of agent computer 50. In the exemplary embodiment, the screen pop will provide the agent with information such as, but not limited to, the automatic number identification (ANI), dialed number identification service (DNIS), an order number, a company identification code (CIC), and the exit point from IVR system 44a. The exit point is preferably the last step in a script associated with IVR system 44a from which the customer exited IVR system 44a.

Figure 3:
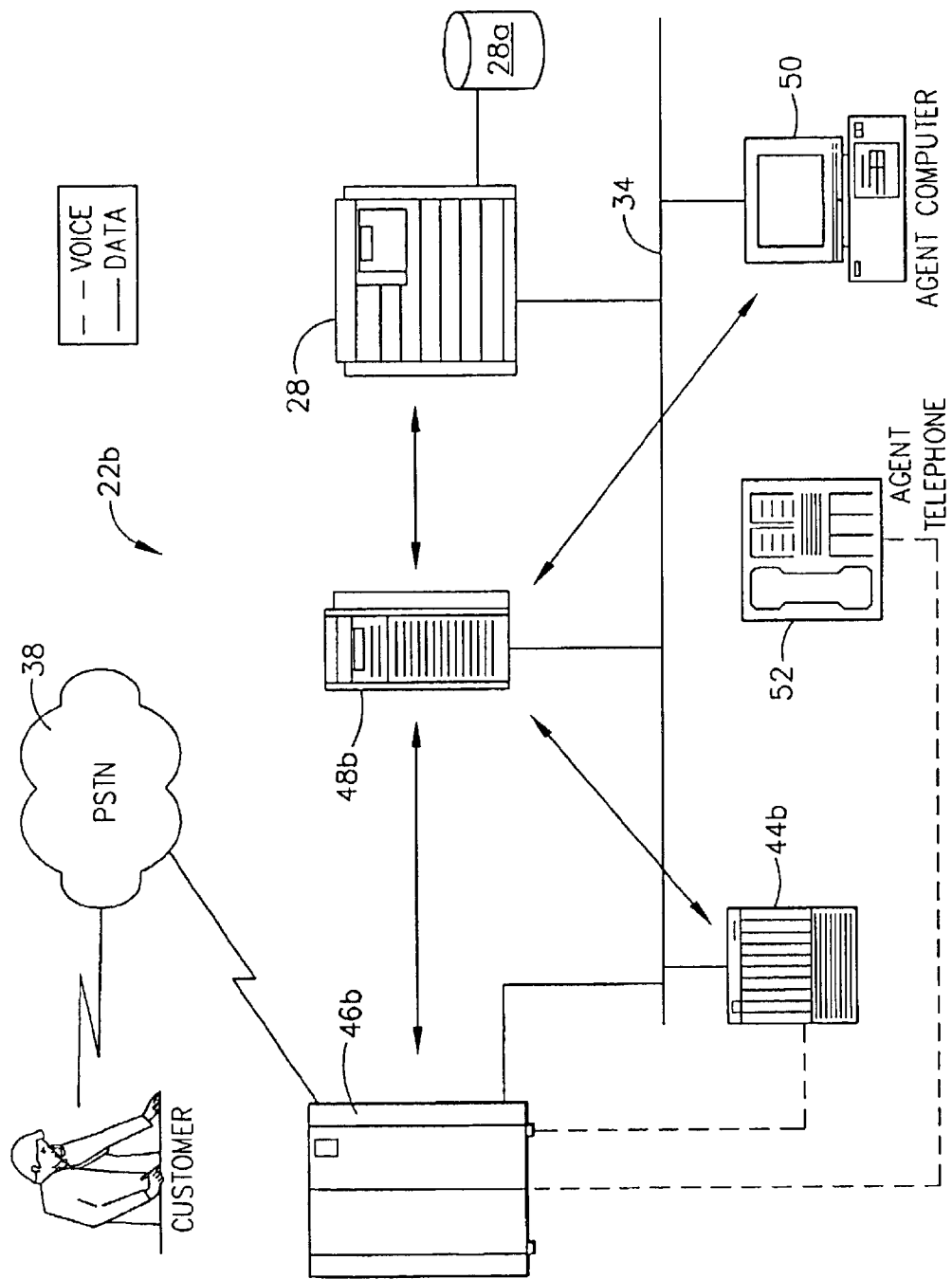
FIG. 3 illustrates another exemplary embodiment of a call center of the present invention.

Referring now to FIG. 3, there is shown another exemplary embodiment 22b of call center 22. Call center 22b has IVR system 44b on the back end of switch 46b which is preferably coupled to PSTN 38. It should be apparent to one of ordinary skill in the art that the IVR system can be placed before or after the switch and function as described herein. In this exemplary embodiment, IVR system 44b, CTI server 48b, and agents' computers 50 are preferably connected by network 34.

In operation, when a telephone call is received from a customer, voice data (depicted as broken lines in FIG. 3) is transmitted from switch 46b, IVR system 44b, and agent telephone 52. At about the same time, CTI server 48b passes data from IVR system 44b and causes a screen pop on the monitor of the available agent's computer 50.

In addition to causing a screen pop on agent computer 50, CTI server 48b preferably transfers contact information or data received during the telephone call to database 28a of tracking system 28 via the network 34. The contact information or data preferably includes, but is not limited to, the ANI, DNIS, order number, contact identification number, exit point from IVR system 44b, and any other suitable and desired data received via IVR system 44b and/or CTI server 48b. An exemplary database 28a suitable for use in the present invention is an Oracle® 8.x, a trademark of Oracle Corporation, Redwood Shores, Calif. Database 28a may be a complete database management system (DBMS) which acts to organize and standardize data retrieval and storage. Database 28a is preferably controlled by a language that helps to manipulate the data and that allows querying of database 28a. A language suitable for use in the present invention, includes, but is not limited to, SQL. It should be apparent to one of ordinary skill in the art that other suitable languages can be used.

Figure 4:
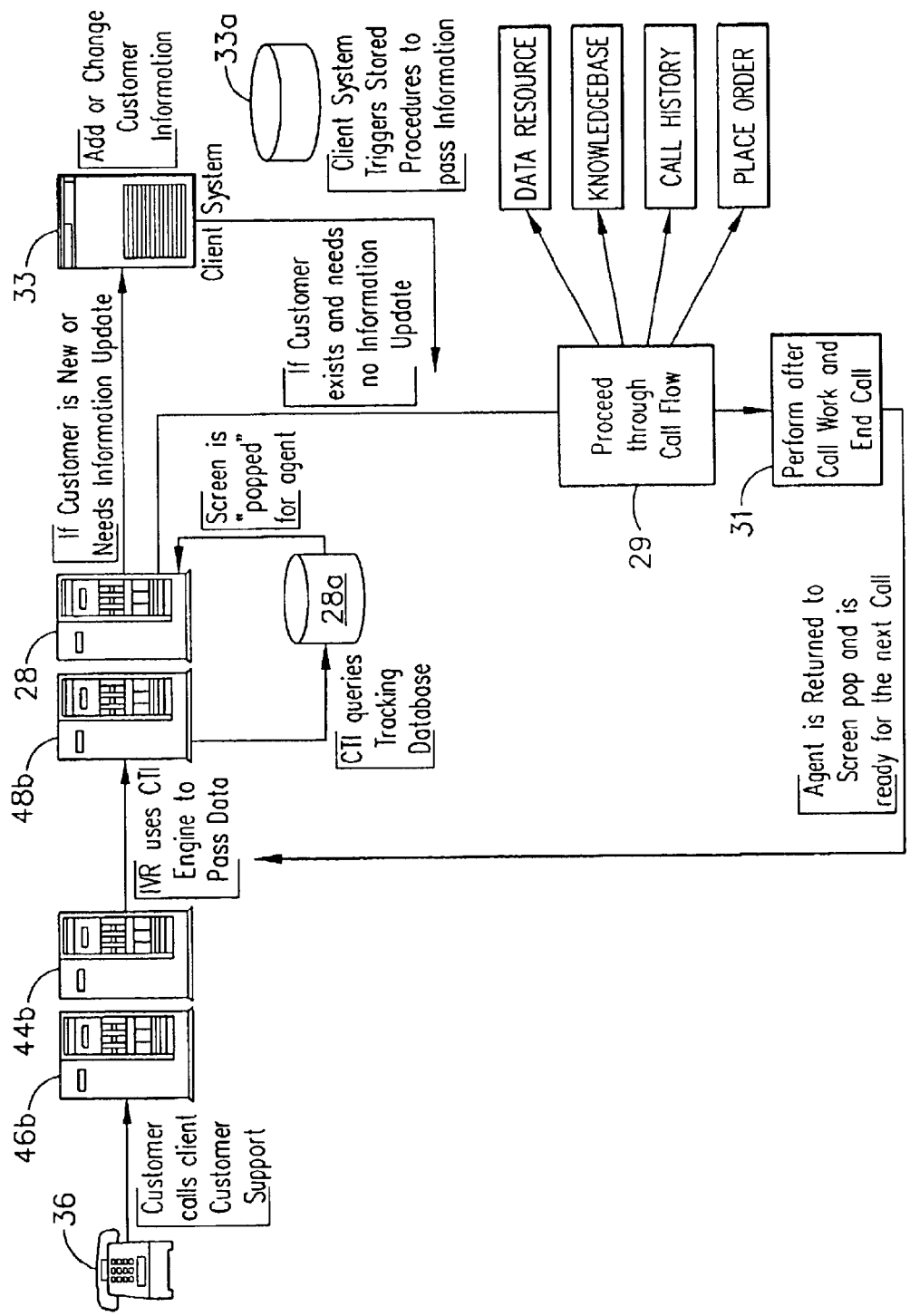
FIG. 4 illustrates an exemplary call flow diagram of the present invention.
Figure 5:
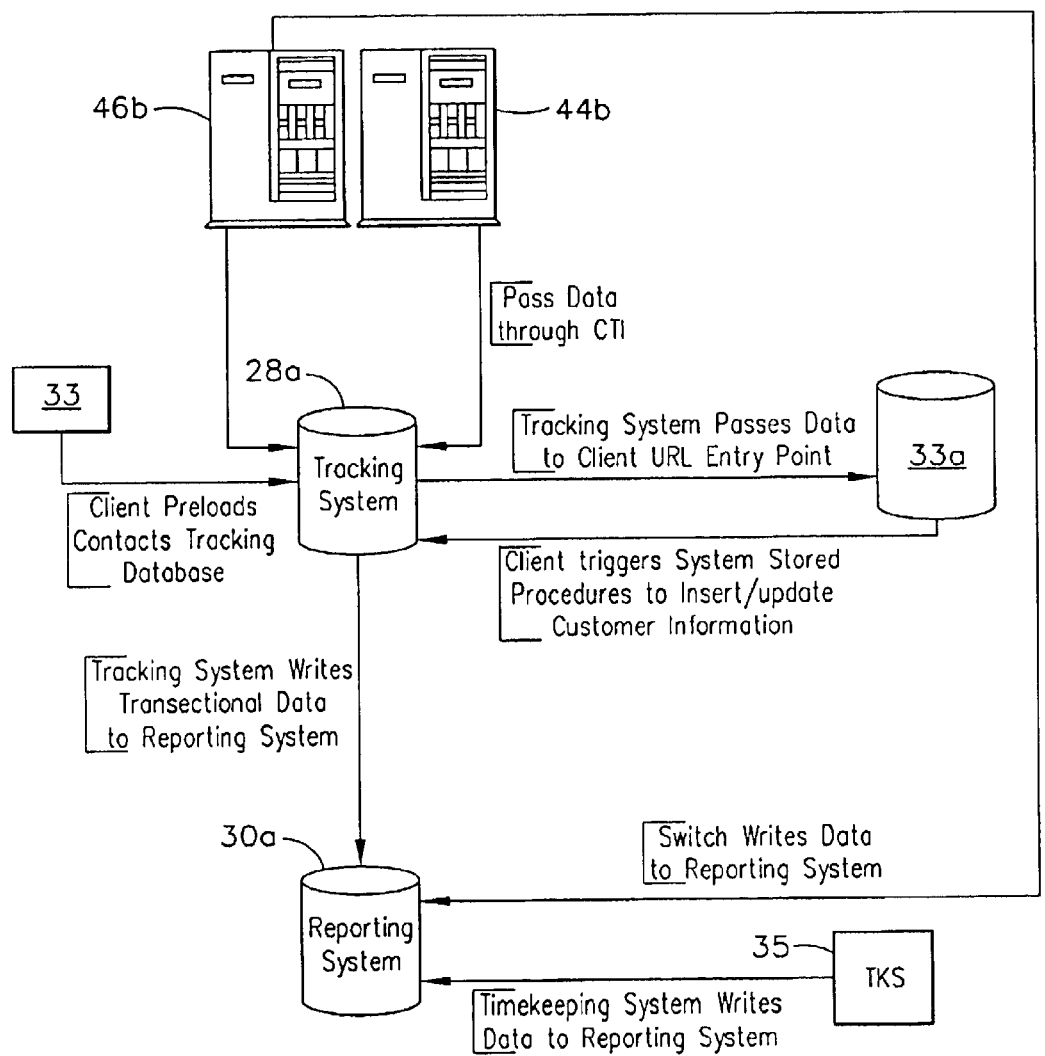
FIG. 5 illustrates an exemplary data flow diagram of the present invention.

Referring now to FIGS. 4 and 5, there are shown exemplary call and data flow functional diagrams of an exemplary call and data flow process through an exemplary call center. Particularly, FIG. 4 is a call or voice data flow diagram of an exemplary embodiment of the present invention, and FIG. 5 is a related data flow diagram.

Referring first to FIG. 4, in operation, incoming telephone calls from customer telephones 36 flow through switch 46b and are placed in IVR system 44b. IVR system 44b preferably segments the calls in the manner described above. The segmented calls are then preferably transferred to a live agent who can interact with the customer directly via agent telephone 52 (not shown). Alternatively, it should be recognized by one having ordinary skill in the art that calls to predetermined telephone numbers might be made directly to live agents.

An agent who receives a telephone call will also preferably receive a screen pop that contains information about the call. For example, IVR system 44b uses CTI server 48b to pass contact information or data to database 28a of contact tracking system 28, and the agent will receive a screen pop from IVR system 44b containing the contact information. The contact information preferably includes, but is not limited to, the ANI, the DNIS, the order number, the company identification number, and the exit point from IVR system 44b.

After the agent receives the screen pop, tracking system 28 uses the ANI, for example, to determine if contact information about the customer already exists in database 28a. If no match is found, tracking system 28 allows the agent to search by other criteria, such as, but not limited to, a contact identification number, first and last name, business name, phone number, fax number, e-mail address, or other suitable criteria. If contact information about the customer already exists in database 28a, the agent proceeds through the call flow. However, if no existing contact information is found or if the contact information is inconclusive, e.g., multiple customers have the same ANI, the agent can use a graphical user interface (GUI) (which will be described in more detail below with respect to FIGS. 10–17) of contact tracking system 28 to perform a more intensive search of database 28a.

For example, as noted above, the agent can prompt the customer over the telephone for additional information, such as the customer's first and last name, business name, zip code, phone number, fax number, e-mail address, or contact ID number. The agent can then use the GUI to search database 28a using any of these criteria. If the agent is still unable to identify the customer in the database 28a or if the agent locates the customer in database 28a but needs to update the contact information, for example, update the customer's address or telephone number, the agent then enters the new or updated customer contact information into a database 33A of a client system 33 which is preferably coupled to database 28a via network 34 or other suitable connection. After the contact information is entered into database 33A, client system 33 triggers a set of stored procedures for contact tracking system 28 and transfers the appropriate contact information back to database 28a of contact tracking system 28. In an alternative embodiment, the agent could update the contact information in database 28a of contact tracking system 28 and then a computer program or other suitable means could transfer the updated contact information to database 33A of client system 33 on a periodic and automatic basis.

Once the appropriate contact information is stored in database 28a, the agent proceeds with the rest of the telephone call flow, as depicted by step 29 in FIG. 4. For example, the agent can talk to the customer to capture specific pieces of information about the call itself, such as call source and ad code, or to learn more about the reason why the customer is calling. The agent can then assist the customer by providing some or all of the following services: selling products and services; cross-selling and up-selling products and services; taking product orders and processing credit card orders; providing comparative product information; positioning and selling the client's products versus the competitor's products; communicating data sheet information about the products and services; answering questions about the products and services; capturing additional information about the customer and the customer's contact history; assisting the customer with web-based interaction; checking on the customer's order status; providing referrals to other people or organizations that can better answer the query; documenting the customer's feedback and escalations; conducting surveys to determine what products and services interest the customer; and sending requested product literature to the customer by fax, mail, or e-mail. In addition, the agent can perform the following functions: invoke client system 33 to, for example, obtain reference materials about the client's products and services; search database 28a of contact tracking system 28 to obtain contact history information, invoke a shipping system, such as, but not limited to, Federal Express™, or an ordering system as needed during the telephone call to assist the customer. Once the agent is finished with the call, the agent can perform other work after the call, for instance, updating database 28a with disposition information or other comments, as depicted by step 31 in FIG. 4. After the agent has completed the work after the call, then the agent is returned to a ready to receive call mode which will be described in more detail below.

There is also preferably a computer software program operating at each agent computer 50 that helps an agent manage and respond to customer contacts. In particular, the software program is preferably adapted to put agent computer 50 and agent telephone 52 in an operating mode, which can include, but is not limited to, the following states of operation: (1) a not ready to receive a new contact mode; or (2) a ready to receive a new contact mode. The agent can use a mouse, keyboard, or another appropriate input device coupled to agent computer 50 to access the software program and control the operating mode. When an agent has agent telephone 52 and/or agent computer 50 in a not ready to receive a new contact mode, the customer can be routed elsewhere so that the customer will not have to wait for that particular agent. In addition, it prevents an agent from being interrupted by a new customer while the agent is busy dealing with another customer.

In an exemplary embodiment of the present invention, the not ready to receive a new contact mode preferably includes a contact presently ongoing mode. The not ready to receive a new contact mode may also include a standby during data entry mode and an away from the agent telephone mode. The away from the agent telephone mode can be used by an agent who is on a break or otherwise away from agent telephone 52 for any reason. The agent can place his or her phone 52 and/or computer 50 in the standby during data entry mode after completing, a contact with a customer. In the standby during data entry mode, the agent can enter additional information into database 28a of contact tracking system 28. Such information can include, but is not limited to, the following: the disposition of the query, which can describe what steps the agent took to answer the customer's questions; additional reasons for the query; and additional comments made by the customer. Once the agent completes the post-call functions, such as data entry, and is ready to receive another telephone call, the agent can return agent telephone 52 to a ready mode. When the agent receives the next telephone call, the agent will receive another screen pop and the call flow will be repeated.

Referring to FIG. 5, there is shown an exemplary data flow diagram according to the present invention. As shown in FIG. 5, data can be preloaded into database 28a of contact tracking system 28 from client system 33. In this fashion, the client is given access to the amount and type of data being stored in database 28a. In addition, as described above, data can also be passed from switch 46b and IVR system 44b. In yet a further embodiment, as described above, once an agent enters new or updated customer contact information into database 33A of client system 33, which is preferably coupled to database 28a via network 34 or other suitable connection, client system 33 triggers a set of stored procedures for contact tracking system 28 and transfers the appropriate contact information back to database 28a of contact tracking system 28. In an alternative embodiment, the agent could update the contact information in database 28a of contact tracking system 28 and then a computer program or other suitable means could transfer the updated contact information to database 33A of client system 33 on a periodic and automatic basis.

The data stored in database 28a can then be passed to a database 30a associated with a contact center reporting system 30 (which will be described in more detail below with respect to FIG. 6). Other data regarding, for example, an agent's time, or associated data can also be transferred to database 30a from, for example, an agent timekeeping system (TKS) 35. Such data could include, but is not limited to, the amount of time each agent spends per contact, the total amount of time an agent is working, or other suitable information. In another example, data can be passed from switch 46b to database 30a. This information can then be reported to the client, which will be described in more detail below with regard to FIG. 6.

Referring again to FIG. 1A, in addition to telephone calls placed to system 20 as described above, customers may also contact system 20 of the present invention via a public computer network, such as but not limited to, the Internet 42 or via other suitable types of electronic communication mediums. In particular, customers can send e-mail messages to e-mail server 24, and customers can visit a client's web site at WWW server 26. It should also be apparent to one having ordinary skill in the art that customers can contact system 20 via any conventional direct electronic mail connections between the customer and system 20. The WWW server 26 may be configured for functions such as, but not limited to, purchase or order requests, customer service, technical support, Internet chat, and assisted browsing, which will be described in more detail below. For example, while visiting the client's web site, a customer may click on a "Help" or "ORDER" button of a web page or enter a command with the keyboard in order to request assistance or place an order. The WWW server 26 may then provide a HTML form for the customer to complete or automatically connect the customer to an agent, using, for example, a conventional direct audio connection, such as Voice over Internet Protocol (VoIP). VoIP is explained in more detail in U.S. Pat. Nos. 5,867,495, 5,883,891, 5,910,946, and 5,963,551, each of which is herein incorporated by reference in its entirety. The HTML form may request information such as the customer's name, address, and phone number, the subject of the query, the type of desired help, a product identifier, the method of payment, and/or the Uniform Resource Locator (URL) where the customer needs assistance. After the customer completes the form, the customer sends the form to the WWW server 26 for further processing and distribution.

In an exemplary embodiment of the present invention, agents and clients have access to information regarding a customer's contacts with e-mail server 24 and WWW server 26. In order to provide this access in a timely and efficient manner, system 20 passes data from the e-mail server 24 and the WWW server 26 to database 28a of the tracking system 28. Network 34 is preferably configured to automatically transfer desired contact information from e-mail server 24 and WWW server 26 to database 28a, of tracking system 28. This contact information may include, but is not limited to, the name and address of the customer, the e-mail and IP address of the customer, the type of contact, the date and time of the contact, the content of the contact message, the subject of the contact, the type of assistance requested, and the product that is the subject of the request. It should be apparent to one of ordinary skill in the art, however, that additional information may be included, for example, a customer identifier that can be used for cross-referencing an individual customer to a particular client, which will be described in more detail below.

Data transfer between servers 24 and 26 and database 28a of tracking system 28 can be accomplished by automatic forwarding of the data. Alternatively, data transfer between servers 24 and 26 and database 28a of tracking system 28 can be carried out by automatic pulling of the data. It is preferred that the automatic forwarding or pulling steps take place at predetermined intervals. It should also be apparent to one having ordinary skill in the art that the data could also be transferred from servers 24 and 26 to database 28a manually, however, an automated data transfer system is preferred. For example, servers 24 and 26 may be programmed to automatically forward contact information to database 28a of tracking system 28. Alternatively, tracking system 28 may be programmed to pull contact information from servers 24 and 26. It should be recognized that the data transfer programs may be written in a number of different languages, such as, but not limited to, C++ or SQL.

The contact information may be published or produced by system 20 for each client at defined intervals and stored on e-mail server 24 and WWW server 26 or on separate databases associated with e-mail server 24 and WWW server 26. These intervals can range from about a couple of seconds to about 24 hours or more depending upon each client's requirements. Once the contact information is stored on e-mail server 24 and WWW server 26, the contact information is then preferably transferred to a staging table or database 24A associated with email server 24 or a staging table or database 26A associated with WWW server 26. An example of a staging table 24A or 26A is an Oracle® 8.x or any other suitable database. It should be understood by one of ordinary skill in the art that a single staging table could be associated with both e-mail server 24 and WWW server 26. However, it is preferred that each server has an associated staging table. It should also be apparent to one having ordinary skill in the art that a similar staging table could be used for the contact information collected from the customer telephone calls as described above.

An exemplary data structure 2000 for an exemplary staging table 24A or 26A suitable for use in the present invention is shown in FIG. 1B. It should be understood by one having ordinary skill in the art that the exemplary data structure is shown for exemplary purposes only and should not be construed as limiting the present invention to the exemplary structure shown. Indeed, other data structures and arrangements could be used and still be within the scope of the present invention.

As shown in FIG. 1B exemplary data structure 2000 includes a variety of information relating to an e-mail contact. This information includes, but is not limited to the following: a Message$_{13}$ ID 2001, which is preferably a unique identifier of the e-mail message; a Record__create datetime 2003, which is preferably the date and time the record was created in data structure 2000; a Customer__ID 2005, which is preferably used to match the unique customer in the system to the customer record in the system; an Email__Addr 2007, which preferably identifies the e-mail address of the sender (i.e., the customer); a First Name 2009, which preferably identifies the first name of the person associated with the e-mail message; a Last Name 2011, which preferably identifies the last name of the person associated with the e-mail message; a Type 2013, which preferably identifies the type of e-mail, which can include, but is not limited to the following, incoming, response, or originated; a Case__Id 2015, which preferably identifies a thread of communication between the agent and the customer, the thread usually ends when any party stops sending a reply e-mail; a DateTime__Rec'd 2017, which preferably identifies the date and time the e-mail was received; a DateTime__Compl 2019, which preferably identifies the date and time the e-mail was completed; an Orig__Subject 2021, which preferably identifies the incoming e-mail subject; an Orig__Email__Body 2023, which preferably identifies the body of the incoming e-mail; a Reply__Subject 2025, which preferably identifies the reply e-mail subject line; a Reply__E-mail body 2027, which preferably identifies the body of the reply e-mail; a Note 2029, which preferably identifies any notes that the agent writes about the message; a HasAttachment 2031, which preferably identifies whether or not the e-mail has an attachment, preferably using a "1" to designate that there is an attachment and a "0" to designate that there is not an attachment; a Mailbox 2033, which preferably identifies the e-mail box that the message was received in; a Folder__Name 2035, which preferably identifies the current location of the e-mail message; and a Complete record 2037, which preferably identifies whether or not the message has been completed, preferably using a "1" to designate that the message has been completed and a "0" to designate that the message has not been completed.

Once the contact information is transferred, it is stored in a common format, such as that described above and shown in FIG. 1B, in staging table 24A and staging table 26A. In this fashion, the information can be retrieved for a variety of customers and a variety of clients without regard to the particular format of the information. It is preferred, however, that a web-based form be provided to customers, if they are contacting system 20 via, for example, the Internet 42, wherever possible so that the format of the data can be prearranged on the web-based form. This will increase efficiency of the data transfer between servers 24 and 26 and their respective staging tables 24A and 26A.

As noted above, each record in staging table 24A or 26A may include, but is not limited to, the name and address of the customer, the e-mail and Internet Protocol (IP) address of the customer, the type of contact, the data and time of the contact, the content of the contact message, the subject of the contact, the type of assistance requested, and the product that is the subject of the request. Formatting this information in staging tables 24A and 26A using a data structure such as that shown in FIG. 1B prior to sending the information over to database 28a of tracking system 28 helps to ensure consistent data transfer and, as noted above, adds to the overall efficiency and reliability of the information processing system. The records in staging tables 24A and 26A may be updated or created each time data is added for a particular client or instance within table 24A or 26A.

Once the contact information or data is stored in staging table 24A and 26A in a preformatted arrangement, the contact information is read or transferred from staging table 24A and 26A to database 28a of tracking system 28. As noted above, this data transfer may be accomplished by automatic forwarding, or, alternatively by pulling of the data, between staging table 24A and 26A and database 28a of tracking system 28.

In an exemplary embodiment of the present invention, tracking system 28 or a computer program associated therewith, monitors staging tables 24A and 26A and initiates a transfer procedure when new contact information is added to staging tables 24A and 26A. Alternatively, staging tables 24A and 26A, or software programs associated therewith, can initiate or trigger stored procedures on tracking system 28 which transfers the data from staging tables 24A and 26A to database 28a of tracking system 28. The stored procedures are preferably configured to read the data, including a customer identifier that may be used for cross-referencing different contacts (i.e., Internet, electronic mail, telephone, hard copy correspondence, etc.). In addition, these stored procedures can determine the locations within database 28a to store the information. Posting of the contact information within database 28a of tracking system 28 will generally be in the same format as in staging tables 24A and 26A for the reasons noted above. However, it should be apparent to one of ordinary skill in the art that the contact information can be reformatted or repositioned based on a particular client's needs. Once the contact information is posted to, database 28a of tracking system 28, an agent can access tracking system 28 and review contact history information for individual customers or groups of customers via an interactive contact information software program loaded on agent computer 50 or an equivalent thereof.

Figure 6:
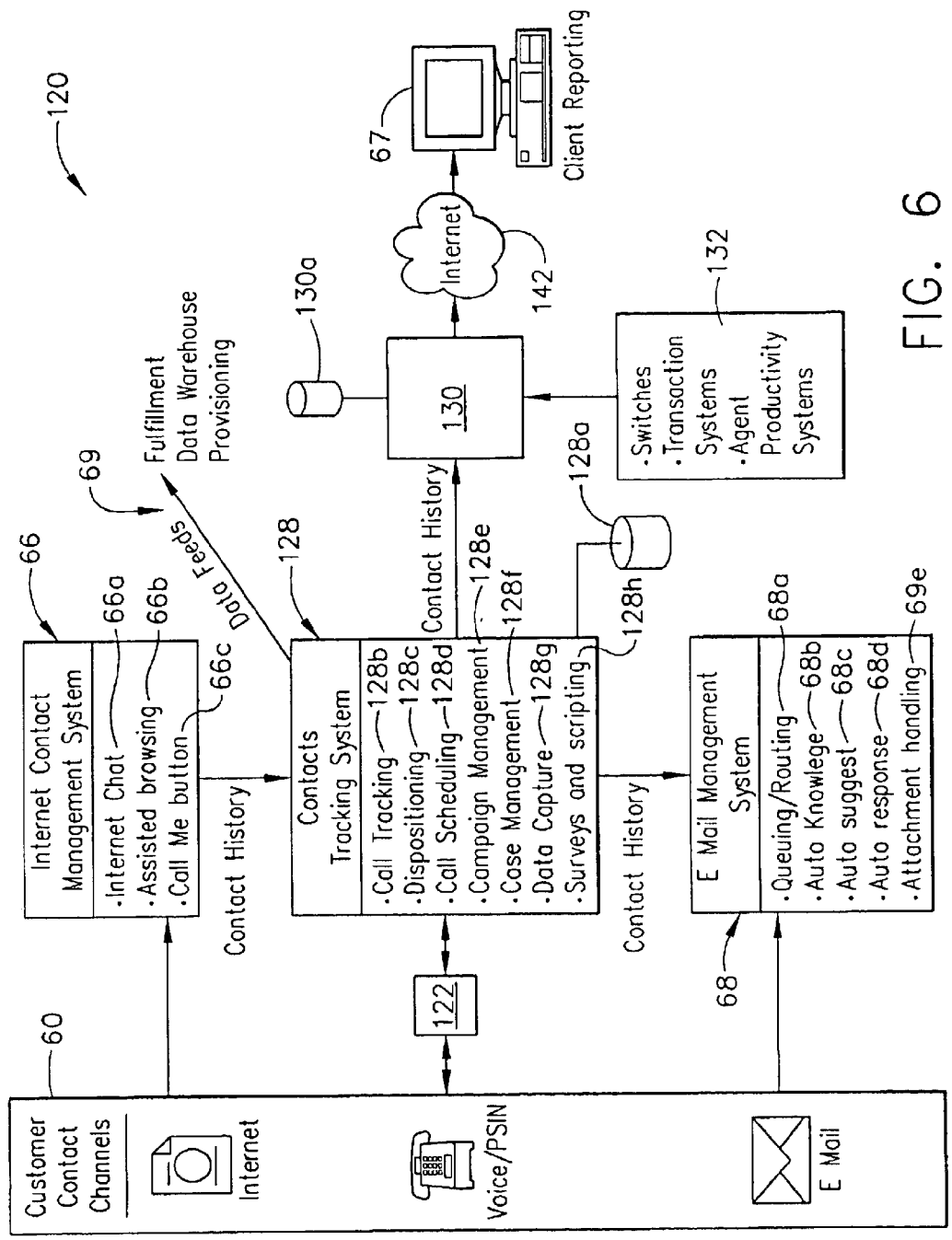
FIG. 6 illustrates another exemplary embodiment of a customer contact information management system of the present invention.
Figure 20:
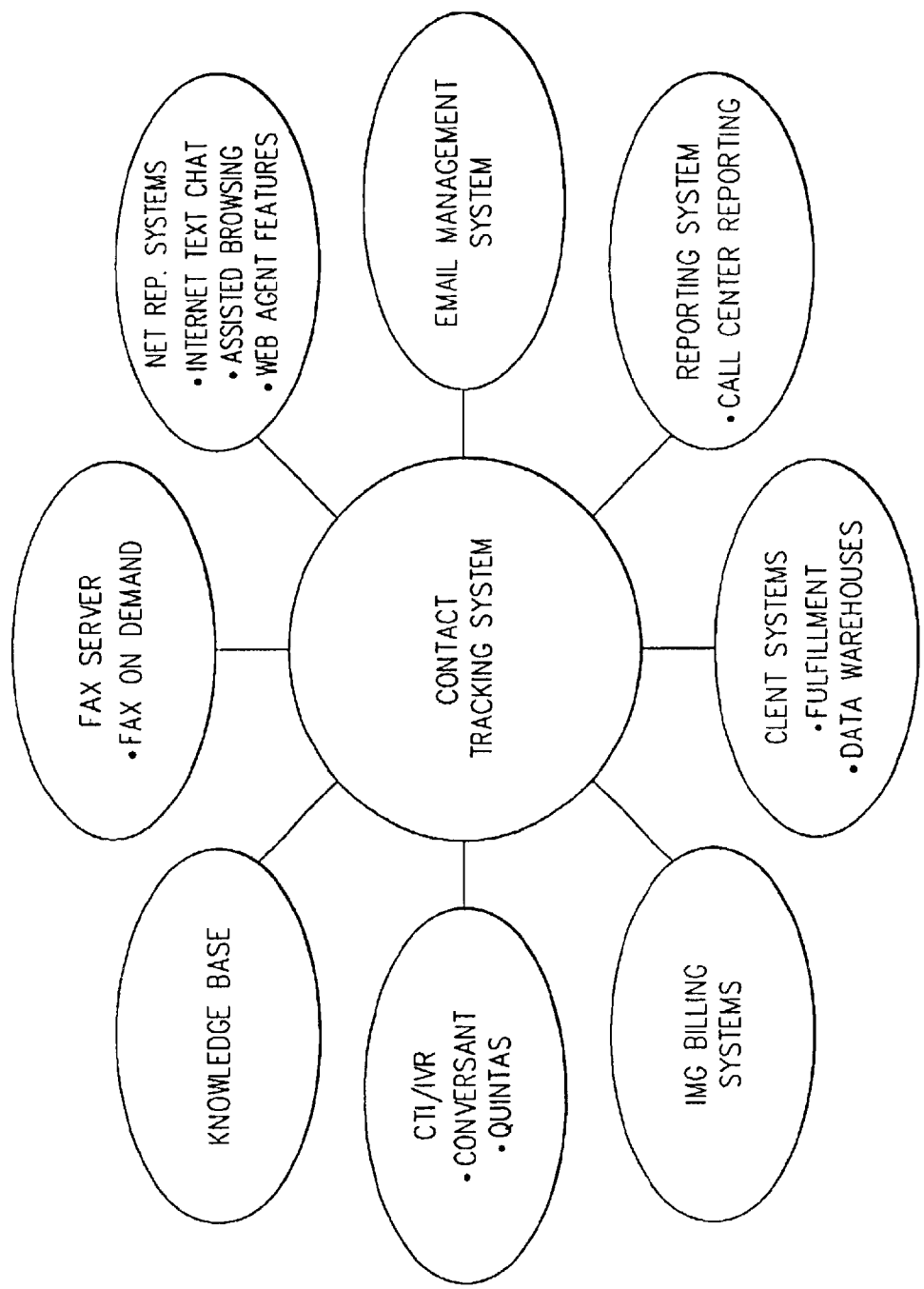
FIG. 20 is a diagram of an exemplary system strategy of the system of FIG. 6.

Having described one exemplary embodiment of the customer contact information management system 20 above, another exemplary embodiment of system 120 is shown in FIG. 6. It should be apparent to one of ordinary skill in the art that the description of the components of system 20 described above are relevant to the system 120 referenced in FIG. 6 and should be considered consistent with, and/or cumulative to, the description that follows. FIG. 20 is a diagram of an exemplary system strategy of the system 120 of FIG. 6.

As shown in FIG. 6 and as noted above, a customer may contact system 120 through a plurality of customer contact channels 60, including, but not limited to, the Internet, telephone, electronic messages, and hard copy correspondence. System 120 preferably includes an internet contact management system 66, contact tracking system 128, an e-mail management system 68, contact center reporting system 130, and contact center management system 132. An exemplary e-mail management system 68 suitable for use in the present invention is similar to the one described in U.S. Pat. application Ser. No. 08/897,777, filed Jul. 21, 1997, the entirety of which is herein incorporated by reference.

Internet contact management system 66 preferably includes, but is not limited to, a WWW server 126 and a database associated with WWW server 126. Internet contact management system 66 may include, but is not limited to, a plurality of processes and software suitable for implementing such processes, including Internet Chat 66a, assisted browsing 66b, and a "Call-Me Button" 66c. Internet Chat 66a may comprise both text and visual real-time communications between an agent and a customer and can exist in various forms of correspondence, including, but not limited to, one-to-one, one-to-many, many-to-one, and many-to-many textual and/or visual interaction over the Internet.

Assisted browsing 66b may allow an agent to initiate control of a customer's computer in order to help navigate the customer through a client web site or aid the customer in placing orders. Assisted browsing 66b may include various embodiments, including, but not limited to, collaborative browsing, sharing standard web forms between the agent and the customer, sharing framed web pages hands-free operation for customers providing the agent "remote control" of the customer's computer, and real-time network diagnostics for performance monitoring.

Call-Me Button 66c preferably comprises an icon on the customer's browser screen which enables the customer to request to either talk to an agent immediately or to have an agent call the customer at the earliest convenience. In an exemplary embodiment, Call-Me Button 66c would initiate an immediate response from the agent which could exist in a form, such as, but not limited to, two-line callback or single-line callthrough. Internet contact management system 66 could also include other processes and software for implementing such processes, such as Voice Over IP ("VoIP"), which enables a customer to browse a web site while simultaneously conducting a conversation with a customer representative or agent.

E-mail management system 68 preferably includes, but is not limited to an e-mail server 124 and a database associated with e-mail server 124. E-mail management system 68 is adapted to perform tasks such as queuing and routing 68a of messages, which will be described in more detail below with reference to FIG. 10, auto-acknowledge 68b, auto-suggest 68c, auto-response 68d, and attachment handling 68e.

Auto-acknowledge 68b notifies the customer who has sent an e-mail to e-mail management system 68 that the e-mail has been successfully routed to a particular agent or, alternatively, has been successfully staged in a particular queue and is awaiting action by the agent. Auto-suggest 68c can comprise templates created by either an agent's supervisor or manager or by the agent. These templates are then stored in the memory of the agent's computer. These templates are configured to provide suggestions or recommendations to the agent, or alternatively to the customer. Examples of suggestions can include, but are not limited to, product recommendations, technical search requirements within a particular web site, or answers to frequently asked questions. It is preferred that auto-suggest 68c gives full flexibility for the agent or the agent's supervisor to create templates to meet the needs of the particular client's business.

Auto-response 68d preferably comprises the features of auto-suggest 68c but generally does not require interaction by the agent or the agent's supervisor. Auto-response 68d is preferably configured to recognize key words or phrases embedded in e-mails sent to e-mail contact management system 68. Based upon these key words or phrases or combinations thereof, auto-response 68d initiates a set of procedures. For example, if an e-mail arrives at e-mail contact management system 68 which includes the terms "2000," "catalog," and "send," then auto-response 68d will recognize the combination of key terms and use this combination to search for an appropriate e-mail template. In this example, an e-mail response would be sent containing a pre-addressed address block and the message, "We appreciate your interest in our 2000 catalog. You are a valued customer and should receive your new catalog in approximately 2 to 3 business days." Optionally, the agent can proofread and edit the message before it is sent. In this fashion, a number of pre-formatted e-mail responses can be saved which ultimately leads to quicker dispositions of e-mail requests and adds to the overall efficiency of the system.

Attachment handling 68e is configured in a manner known to one of ordinary skill in the art to attach additional information to e-mails. For example, in the auto-response 68d example described above, instead of sending the catalog via regular U.S. mail, an electronic version of the catalog could be attached to the responding e-mail and sent to the customer.

Figure 7:
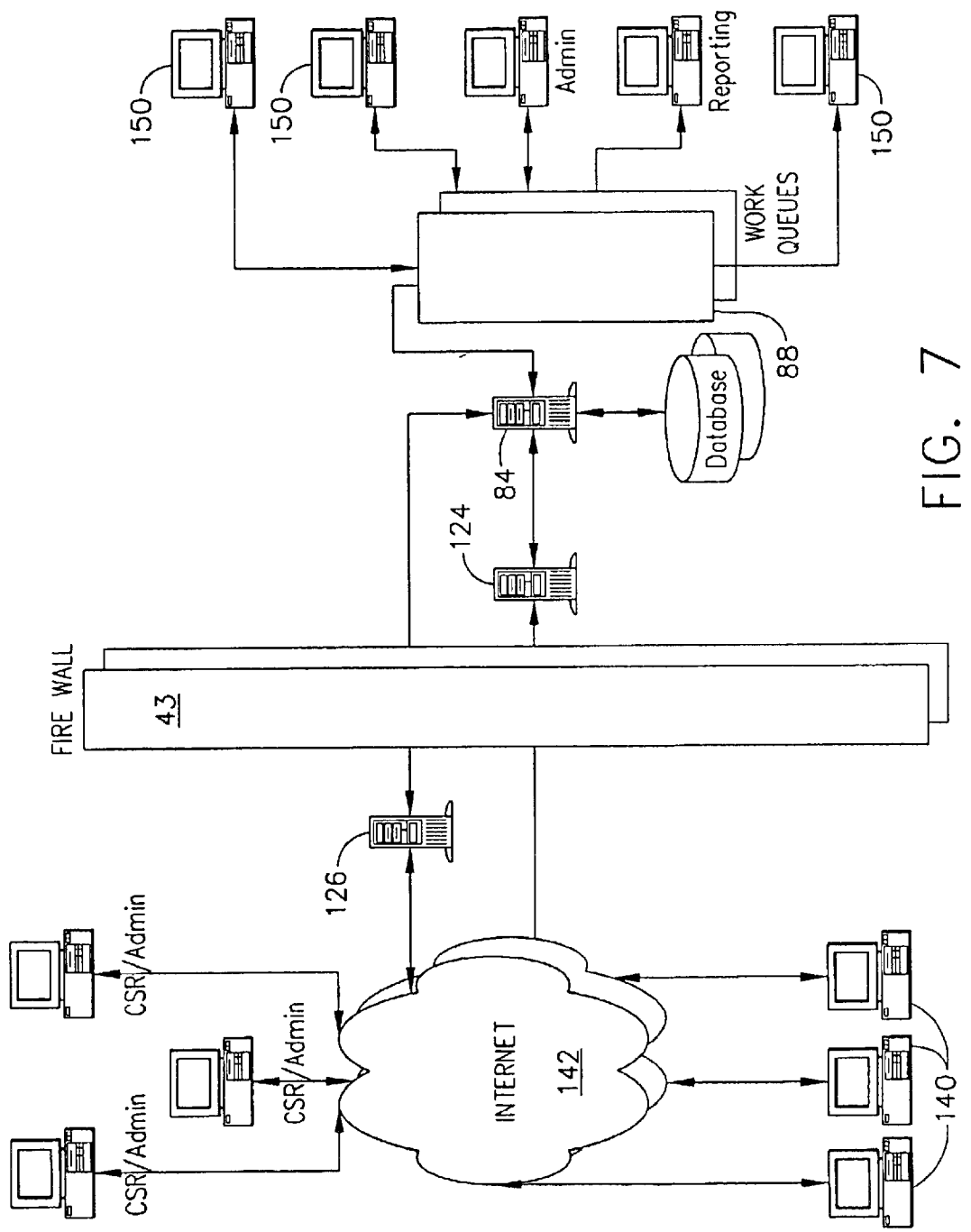
FIG. 7 is a diagram of an exemplary architecture of an electronic message management system of the present invention.

A diagram of the architecture of an exemplary embodiment of electronic message (e-mail) management system 68 is shown in FIG. 7. In the exemplary embodiment shown, a customer creates an electronic message using an e-mail package stored on the customer's computer 140 and addresses the electronic message to an address of a client (e.g., "customerservice@acme.com"). The electronic message is then transferred over Internet 142 through WWW server 126 or e-mail server 124 and optionally through a conventional firewall 43. Optionally, e-mail server 124, WWW server 126, and/or server 84 may "privately-brand" incoming and/or outgoing messages using conventional techniques known to those of ordinary skill in the art now or in the future.

When the electronic message is received by WWW server 126 or e-mail server 124, the message is automatically forwarded to another server 84. At least for e-mail messages, it is preferred that server 84 generates an auto-acknowledgement message indicating to the customer that the e-mail message was received. Server 84, WWW server 126, and/or e-mail server 124 may also perform address translation using conventional techniques known to those of ordinary skill in the art now or in the future so that an e-mail message appears to have been received and responded to from a desired location.

An agent can use one of a plurality of agent computers 150 to access an electronic message via work queues 88. Work queues 88 preferably assist with a logical division of the electronic messages so that an agent can select and access a particular type of message, e.g., an e-mail message directed to customer service, an e-mail message directed to technical support, an e-mail message directed to an order, a web-based order, or a web-based request for customer assistance. The agent can use any appropriate method to respond to an electronic message.

In order to expedite e-mail responses, server 84 is preferably adapted to generate suggested and/or standard responses or templates therefor, particularly for frequently asked questions. Keywords or the context of the e-mail message can trigger these templates. For example, a customer could send an e-mail message to "customerservice@acme.com" saying that he likes Acme's products and would like to receive the year 2000 catalog. One exemplary template could be created based on the keywords "2000/catalog/receive" contained within the e-mail. In such an embodiment, server 84 would serve up the template to agent computer 150.

The template could contain the customer's name, e-mail address, the name of the client, and a generated response to the customer's inquiry. At this point, the agent can proofread and edit the suggested or standard response, or the agent can compose an original response. In addition, the agents can create their own templates based on certain parameters and keywords. The keywords can be used to develop a template and result in merged fields.

With continued reference to FIG. 6, contacts tracking system 128, including database 128a, which stores the contact information received from the plurality of contacts as described above, comprises a plurality of contact information and related functionality, including but not limited to the following: call tracking 128b; dispositioning 128c; call scheduling 128d; campaign management 128e; case management 128f; data capture 128g; and surveys and scripting 128h. Call Tracking 128b preferably includes tracking or capturing telephone calls or other contacts, saving the contact information into database 128a of tracking system 128, which has been described herein above with regard to the previous embodiment, and relating this information to the client in an efficient manner, which will be described in more detail below. This information can include, but is not limited to, the reason why the customer called or contacted the system, the time and date the customer called, and the disposition of the call. Dispositioning 128c refers to what the agent did to resolve the customer's problem or answer the customer's question. In this fashion, dispositioning 128c and its related information allows the client to determine what changes need to be made in either the products or services the client offers.

As noted above, tracking system 128 also includes a call scheduling 128d process and software suitable for implementing the process. Call Scheduling 128d preferably tracks and organizes all incoming and outgoing calls or contacts. For example, if a customer were having a problem with a particular product and places a call to call center 122, for example, call scheduling 128d would log the inbound call. Call scheduling 128d would then schedule any outbound call that needs to be made to serve as a reminder to the agent that the agent needs to contact the particular customer.

Another process included in tracking system 128 is campaign management 28e. Campaign management 128e includes managing a sequence of contacts with a targeted customer base. In particular, campaign management 128e manages inbound and outbound campaigns configured to capture additional revenue and/or information for clients.

An exemplary inbound campaign includes conducting an advertising campaign for a client after the client has launched a new product, such as the launch of a new drug campaign. Such a campaign could include, for example, implementing multiple modes of advertising across multiple contact channels, such as Internet, voice-mail, and e-mail. The system could then track responses to these various campaigns which would allow clients to obtain valuable information about the effectiveness of their advertising campaigns.

An exemplary outbound campaign includes contacting a group of customers through, for example outgoing call campaigns. Such a group of customers could, for example, have service agreements set to expire. In such a case, the campaign would inquire as to whether the customers want to extend the agreements or if they are interested in the new version of the product. In this fashion, clients can extend their relationships with customers who have not recently purchased new products, thereby opening up additional avenues of revenue.

In an exemplary embodiment, campaign management 128e preferably knows how each particular customer prefers to receive information (e.g., via telephone, Internet, or e-mail) so that they can contact the customer in the prescribed and requested fashion.

In addition, tracking system 128 includes a case management 128f functionality. Case management 128f ties a set of related contacts together. These contacts can be tied together in a number of ways, including, but not limited to, an event, such as failure of a product, or the sale of a product. For example, if a customer purchases a product and calls into call center 122 and says that it is not working properly, the agent handles the telephone call and offers solutions either in the present call or subsequent calls or e-mails. The first contact and any subsequent contacts may be linked together by the event of the failure of the product. In this fashion, each contact may be identified individually, but more importantly, as part of a particular contact campaign. Such bundling of contacts provides valuable information to the client so that the client can troubleshoot problems and offer subsequent changes to its products and services if required.

Data capture 128g is an additional process of tracking system 128. Data capture 128g refers to the ability to capture data for clients from contacts based on the particular client's needs. Some examples of typical data that is extracted for a particular client includes, but is not limited to, the following: name of contact; address (e-mail or postal); phone number; information about the contact, for example, DNIS, ANI, call source; reason and disposition of the contact; and notes (preferably a free form area in which agent can add additional information).

Tracking system 128 also preferably includes a surveys and scripting 128h functionality. Generally, surveys consist of three different types: random; product and/or reason; and personal. An example of a random survey is where a group of questions is asked to a customer based merely on that customer being, for instance, the tenth caller. In this fashion, there is no constraint on who the customer is or what the customer's buying preferences are. The second preferred survey type is based upon a product or reason. In this type of survey, every customer who calls about a particular product or for a particular reason, for example, product failure, is asked a set of questions. This type of survey can target specific questions at a particular and narrower population. The third type of survey is based upon the individual customer or, more particularly, the demographics of the customer. These types of surveys allow the client to develop questions directed toward a defined subset of the population.

Scripting, which can be tied to surveys, preferably exists in two forms, hard scripting and soft scripting. Hard scripting generally includes suggestions or questions, which are displayed directly on the agent's computer screen for direct reading by the agent. These generally include survey questions and responses to regulatory matters. Because surveys, however, are usually never conducted in linear fashion (i.e., set responses to set questions), soft scripting is used to provide a more flexible set of directions. Simply put, soft scripting generally includes suggestions that lead the agents through the phone call, e-mail, or other contact. They generally help structure the contact but do not limit the agent to a particular path or script to be taken.

Tracking system 128 also preferably includes, but is not limited to, the following additional capabilities or features: preloading with existing contact information; receiving data from the client's system via the use of stored tracking system procedures and triggers which are written and initiated by the client's system; tracking customers and their contact histories; pops customer information based on data passed from the IVR via CTI; ability to search for a customer with various criteria including an account ID, first and last name, and phone number; if more than one search match is found, a result screen is made available to allow the selection of the appropriate customer account; creating an internal key or account number for each new customer; providing ability to track calls by DNIS and/or contact source; allowing for a three-tiered category/product/sub-product relationship where specific products are tied to a particular category and specific sub-products are tied to particular products; allowing for a two-tiered reason/sub-reason relationship where specific sub-reasons are tied to a particular reason; allowing for the dispositioning of calls to move them through the tracking process; providing for a free form call comments field for CSR use; and providing a listing of previous contacts made by a customer, with the ability to have a read only view of the data from these contacts. Moreover, a plurality of data feeds 69 can be forwarded to other systems to perform processes such as fulfillment of orders, data warehousing, and provisioning of products or services. It should be apparent to one having ordinary skill in the art that a plurality of other data feeds could be within the scope of the present invention based on the data received in contacts tracking system 128.

Referring to FIG. 6, contact information management system includes a contact reporting system 130, including database 130a associated therewith and in data flow communication with database 128a of tracking system 128. Contact reporting system 130 is configured to receive contact information from tracking system 128 as will be described in more detail below. Tracking system 128 may be programmed to automatically and periodically forward the contact information to reporting system 130. Alternatively, reporting system 130 may be programmed to automatically and periodically pull the contact information from the tracking system 128. In addition, as shown in FIG. 6, contact center management system 132 may also provide reporting system 130 with information or data regarding calls to the contact center, the performance of agents, the hours worked by agents, the scheduling of agents, and other suitable information. These functions will be described in more detail below.

One embodiment of reporting system 130 is a central data repository for standard and customized reporting. In such an embodiment, reporting system 130 can integrate contact information from a plurality of systems, for example, but not limited to, tracking system 128 and management system 132, and generate reports using the contact information or other data from the various systems. It preferably offers a standard set of statistical reports, for example, but not limited to, Automatic Call Distributor (ACD), and tracking system reports as well as the ability to create standard or custom reports. These reports are preferably available to an agent through a GUI application, which will be described in more detail below, or to a client reporting system 67 which is coupled to system 120 through a connection, such as the Internet 142.

Figure 8A:
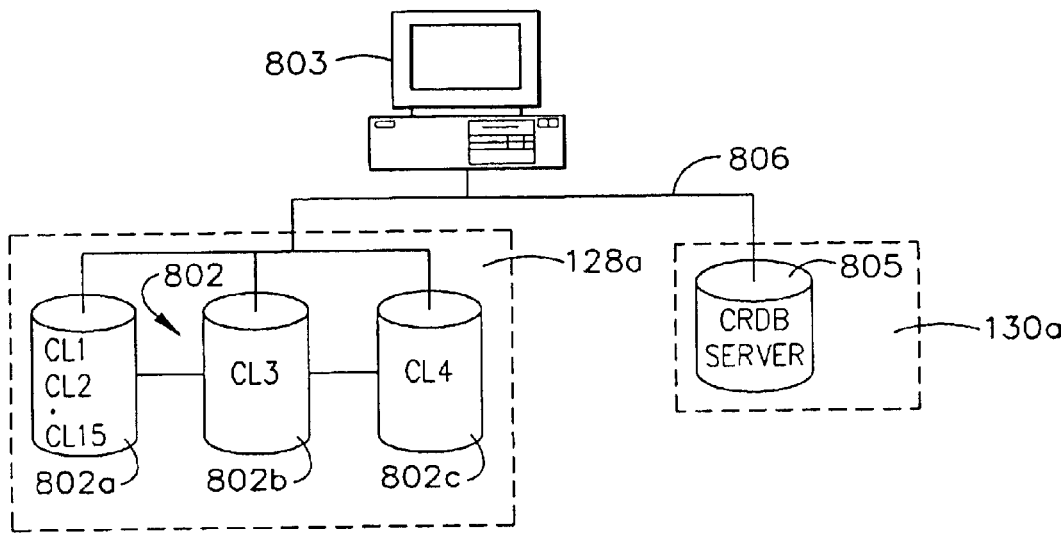
FIGS. 8A–8C illustrate an exemplary architecture of an exemplary embodiment of a reporting system and tracking system of the present invention.

Referring to FIG. 8A, there is shown an exemplary architecture for reporting system 130 and tracking system 128 and their associated databases 130a and 128a, respectively. As can be seen from FIG. 8A, in an exemplary embodiment, database 128a preferably resides on a server 802 and has a plurality of database records or instances 802a–802c associated therewith, which will be explained in more detail below. Likewise, database 130a preferably resides on a server 805. In the exemplary embodiment, servers 802 and 805 are connected via a network 806. A computer 803 is also preferably connected to network 806 and servers 802 and 805. Network 806 can be a local area network (LAN) or a wide area network (WAN) that utilizes Transfer Connect Protocol/Internet Protocol (TCP/IP). Each of the aforementioned components will be described in more detail below.

Figure 8B:
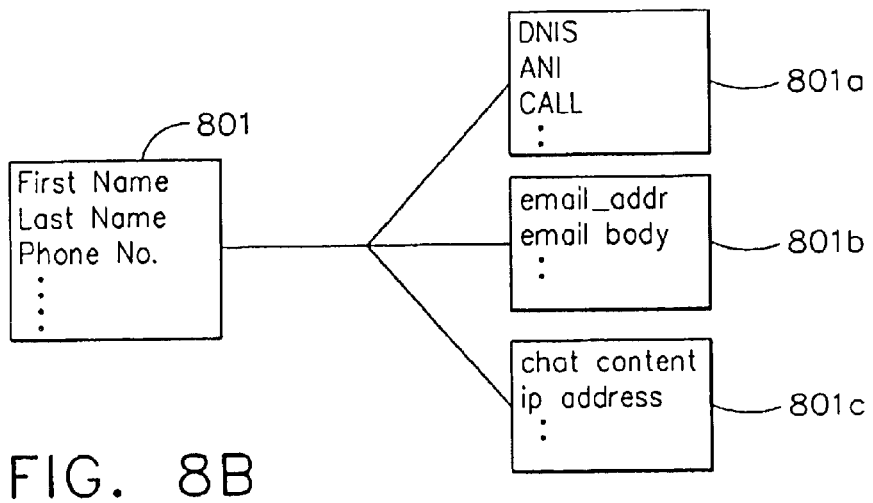

An exemplary data structure, shown as table 801 and records 801a–801c, associated with database 128a is shown in FIG. 8B. Table 801 preferably comprises a plurality of contact information, including, but not limited to the following: name and address of the customer; e-mail and IP address of the customer; type of contact; date and time of the contact; content of the contact message; subject of the contact; type of assistance requested; and the product that is the subject of the request. As has been described above, a plurality of contacts from a plurality of customer contact channels can be tied together or linked based on the particular request or by the particular customer, or other suitable information. As such, each of the contacts may represent one to many related contacts as depicted by the plurality of database records 801a–801c. The information in these tables or databases is preferably configured to be stored in real-time on server 802.

As noted above, tracking system 128 is configured to handle contact information originating from a variety of sources and clients. For a single database record or instance, such as 802a, the system can have client 1 (CL1), client 2 (CL2) and other clients running in the same database on server 802. Additionally, the system can include dedicated instances, such as 802b, which can be configured for a particular client. Moreover, as the system expands, additional clients can be added either to instance 802a, or additional dedicated instances, shown as 802c, can be added.

Referring to FIG. 8A, a software program is included and preferably resides on computer 803 connected via network 806 to server 802 associated with tracking system 128 and database 128a and server 805 associated with reporting system 130 and database 130*a*. The software program residing on computer 803 is preferably configured to transfer the contact information or data residing on server 802 or its associated databases to server 805 so that the contact data can be reported to the plurality of clients associated with the system. The software program preferably includes a scheduler that is configured to initiate the data transfer program at predetermined intervals, such as about every thirty minutes or about every hour. Other transfer intervals, however, may be used.

Figure 8C:
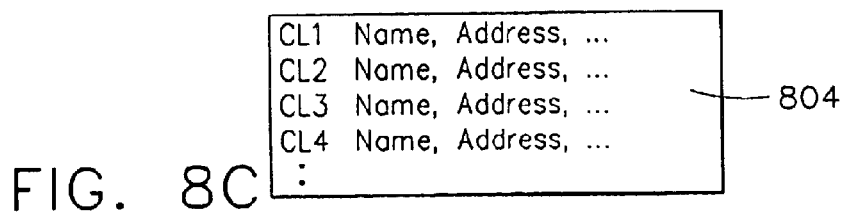

An exemplary data structure, shown as table 804, associated with database 130*a* is shown in FIG. 8C. Table 804 is preferably created for storing the contact information after it is transferred to server 805 in the method described above. It is preferred that there exists a one-to-one or many-to-one relationship between the record entries between table 801 on server 802 and table 804 on server 805. Such correspondence is necessary to accommodate transfer of the contact information in a simple and expedient manner without requiring unnecessary reformatting of the data or reprogramming of the software program residing on computer 803. As noted above, the contact data was preferably formatted when it was transferred into tracking system 128. By maintaining the records in the tables congruent, all data may be passed from one table to the other regardless of whether the client is using each piece of data at the present time for reporting. This allows for flexibility for future reporting characteristics as the needs of the client change. Moreover, by having correspondence between the servers, additional databases can be added to server 802 with the added benefit of being able to offer new clients customized reporting capabilities with minimal effort. It should be understood by one of ordinary skill in the art, however, that the database architectures can be configured in a plurality of ways while still maintaining the preferred correspondence of data within databases.

Once the contact information is stored on server 805, this information can be accessed by a plurality of clients or agents for creating individualized or ad-hoc reports. In addition, reporting system 130 preferably can offer a plurality of custom reports or standard reports to the clients. All of this reporting can take place without affecting the performance of tracking system 128 because the reporting system 130 is preferably directed toward the database residing on server 805 and not the database residing on server 802.

As noted above, it is preferred that all reporting information is stored on server 805 after having been transferred from server 802 in view of the time required for generating reports. However, the present invention is not limited to such an arrangement. Indeed, in an alternative embodiment of the present invention, reporting system 130 can be directed toward the database on server 802. In this fashion, no data would have to be transferred between servers 802 and 805 although it still could be in the manner described above. Such a configuration can be used, for instance, where software programs used for transferring the contact information are not available to properly read particular data or are not compatible with certain databases.

As can be seen in FIG. 6, and as noted above, contact center reporting system 130 may also receive data from another source 132 other than tracking system 128. Contact center management system 132 can include, but is not limited to, the following: telephone switches, which transmit ACD and call handling data directly from telephone switches; transaction systems, which transmit contact history, sales and customer contact data; and agent productivity systems, which transmit timekeeping, financial, call quality, and work force planning data. Accordingly, additional software programs running on additional computers or, alternatively, additional software programs running on computer 803 (FIG. 8A) may be required to transfer this additional information to server 805 of reporting system 130. As should be apparent to one having ordinary skill in the art, it is preferred that this information also be in the one-to-one correspondence described above with respect to servers 802 and 805.

In addition, reporting system 130 preferably offers the following functionality and advantages: GUI and browser based applications for running reports; ability to run ad-hoc reports based on parameters defined by client specific requirements; custom reporting; automated data feeds and data integration so that manual input can be eliminated; timely, concise, and accurate reporting; historical reporting so that users can quickly access historical data and analyze trends; multiple delivery methods, e.g., e-mail, file transfer protocol (FTP), GUL and Internet, so that users can choose how to receive reports; data from multiple switches can be integrated so that call statistics for multiple centers can be reported on together or individually; user and data security so that specific reports are available only to specific users; ability to create graphs and charts so that users can view data in a graphical format; and option to export data into a variety of file types so that the raw data can be used for additional analysis.

Figure 9:
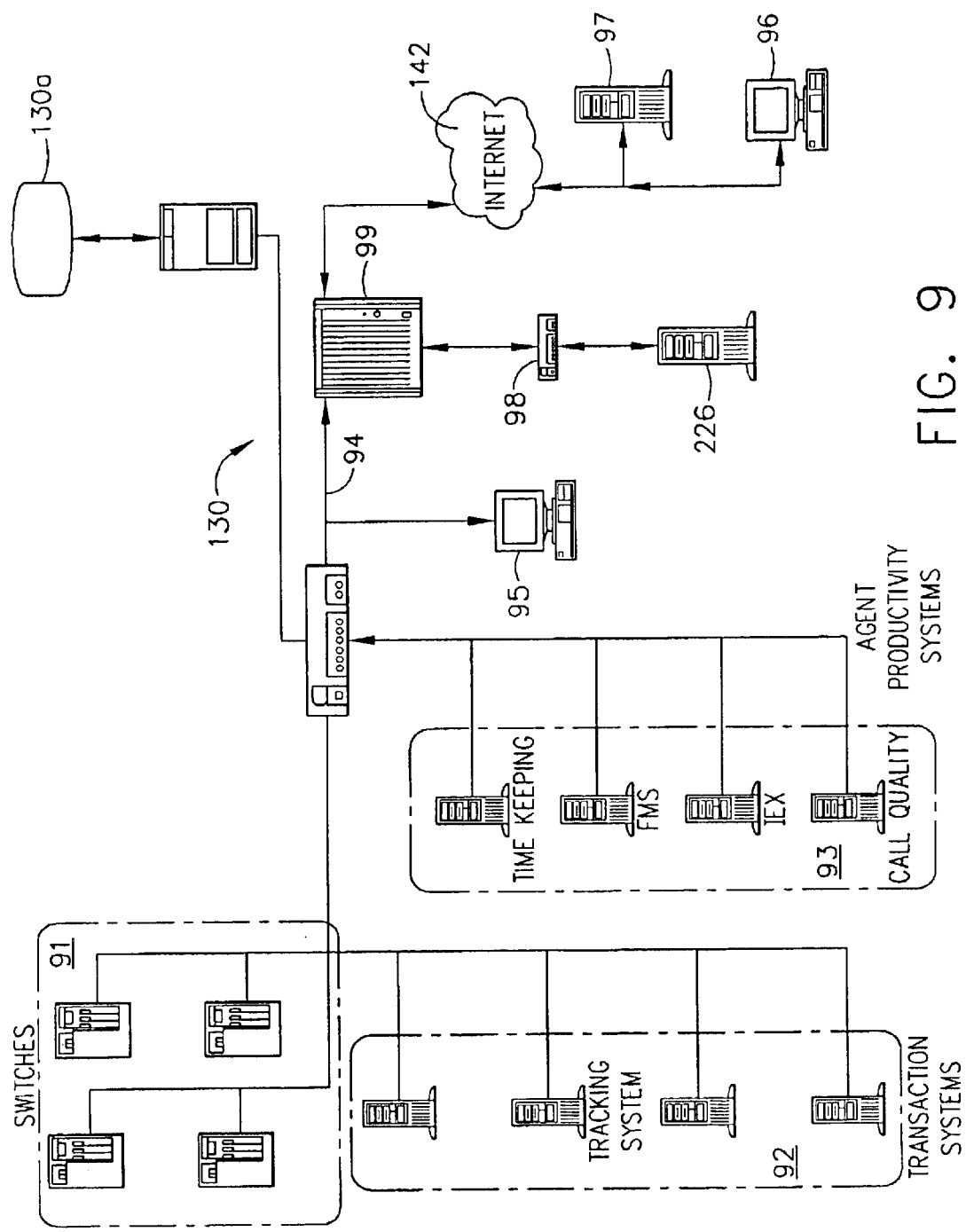
FIG. 9 illustrates an exemplary architecture of another exemplary embodiment of a reporting system of the present invention.

Referring now to FIG. 9, there is shown an exemplary architecture of an exemplary embodiment of reporting system 130 of the present invention. An exemplary database 130*a* suitable for use in the reporting system 130 is an Oracle® 8.x database, a trademark of Oracle Corporation, Redwood Shores, Calif. However, it should be recognized that the database may be any suitable database. As noted above, in the exemplary embodiment of the present invention, reporting system 130 can receive data feeds from a variety of systems. For example, it may receive ACD and call handling data from telephone switches 91. In addition, it may receive contact history, sales, and customer contact data from transaction systems 92, and it may receive timekeeping, financial, call quality, and work force planning data from agent productivity systems 93. A client 95 may be connected to reporting system 130 via a LAN/WAN connection 94. Alternatively, a client 96 can access reporting system 130 through an Internet Service Provider 97 and Internet connection 142. In addition, data can also be received via WVW server 226 through a demilitarized zone (DMZ) network 98 and firewall 99.

As noted above, the reporting system can preferably generate standardized or custom reports. For example, a report can include data from any or all of the following exemplary categories: (1) Volume: ACD calls, flow-in calls, flow-out calls, dequeued calls, calls offered, and calls answered; (2) Service level: average speed of response, calls abandoned, average time to abandon, maximum response delay, average queue time, percent answered, average connect time, average time in voice/data network (VDN), and average time in vector; (3) Agent handling: average talk time, average agent call waiting time, average extension-out time, percent ACD time, average positions staffed, and calls per position; (4) Call routing: vector number, flow-in calls, flow-out calls, calls answered in main, calls answered in backup, other calls connected, calls forced busy, and calls forced disconnected; (5) Call source description; (6) Total count of calls logged by call source; (7) Comment type description; (8) Total count of comments captured by comment type, which provides a summation of each of a particular type of comment made by the customer; (9) Verbatims by comment type; (10) Disposition description, which describes what steps were taken in response to handling, for example, the customer question or complaint; (11) Sub-disposition description, which can describe those actions which were necessary in fulfilling the disposition of the customer's contact; (12) Total count of calls logged by disposition and sub-disposition; (13) Category, product, reason, and sub-reason descriptions, which can relate to the product and its category and the reason and/or sub-reasons for the customer contact, e.g., questions or complaints about a product; (14) Average talk time for calls logged by category, product, reason, and sub-reason; (15) Count of calls logged by category, product, reason, and sub-reason; (16) Percent of calls logged by category, product, reason, and sub-reason; (17) Chart of top 5 by category, product, reason, and sub-reason; (18) Daily call statistics: date, service level, number of CSRs on-line per day per shift, number of inbound calls offered, number of inbound calls handled, inbound average call length, inbound average total call length, average queue time, longest queue time, number of abandoned calls, percent of abandoned calls, average abandon time, number of outbound calls, outbound average call length, summary of deviation from target, summary of notable customer satisfaction issues or escalations, and summary of competitive trends; (19) Daily order summary: total number of orders, total order dollar amount, order dollar by SKU, number of orders per product type, order conversion per product type, average number of items per order, and average order size; (20) Call/service/product type summary: total inbound number of calls per product, total inbound number of calls per service type (pre-sales, post-sales, sales), total inbound number of calls per call type (sales, return, product inquiry, referral), percent of offered inbound calls by call types, average inbound talk time by service types, average inbound talk time by product, average inbound talk time by call types, and service level by service type (when routing is implemented); (21) IVR statistics: number of incoming calls logged, number of calls per IVR option, percentage of calls per option, number of calls per suboption, percentage of calls per suboption, total call minutes by option, breakdown of IVR activity by half hour, number of calls transferred from other entities, and percentage of calls transferred from other entities; (22) Daily e-mail statistics: total number of e-mail messages received, average age of e-mail waiting to be processed, average elapsed response time, number of e-mail responses processed, breakdown by type pre-sales, post-sales, escalation to client, miscellaneous feedback, and status breakdown by product, breakdown by auto-answer vs. semi-custom vs. custom, average time to compose response, and summary of deviation from service level; and (23) Escalation summary: customer name, customer phone number, escalation open date and time, escalation close date and time, reason for escalation, resolution action, breakdown by product type, total number escalated, and breakdown by escalation type.

Figure 10:
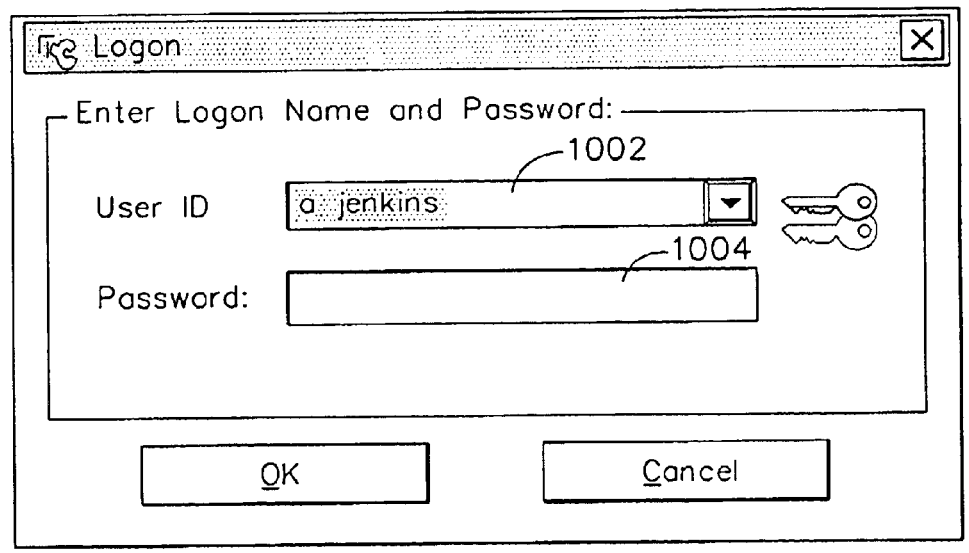
FIGS. 10–17 are exemplary screen shots of an exemplary graphical user interface suitable for use in the present invention.

Referring to FIG. 10, there is shown a computer screen shot of an exemplary logon screen suitable for use in the present invention. Such a logon screen preferably enables an agent to enter the agent's user identification (User ID) 1002 and password 1004. If the User ID 1002 and password are correct for the particular agent, the agent will then be allowed to enter the system. If they are not correct, the agent will be prompted to enter the information again. In the exemplary embodiment, such a logon procedure allows the agent to simultaneously log onto a plurality of subsystems. This eliminates the need for the agent to go to each different subsystem to log in. Such subsystems can include the agent time keeping system which monitors an agent's time for reporting and other functionalities. Another subsystem could include the automatic call distributor (ACD) system which would notify the system that the agent is "on-line" and ready to receive contacts from customers. Additionally an agent could be linked through the log on procedure to the web site of a client or directly into a client's purchasing system, for example. This would give the agent direct access to the client's system thereby enabling the agent to search the client's databases directly or perform other suitable procedures directly within the client's system. It should be apparent to one of ordinary skill in the art that various other systems could also be accessed via the log on procedure described herein and would be well within the scope of the present invention.

Figure 11:
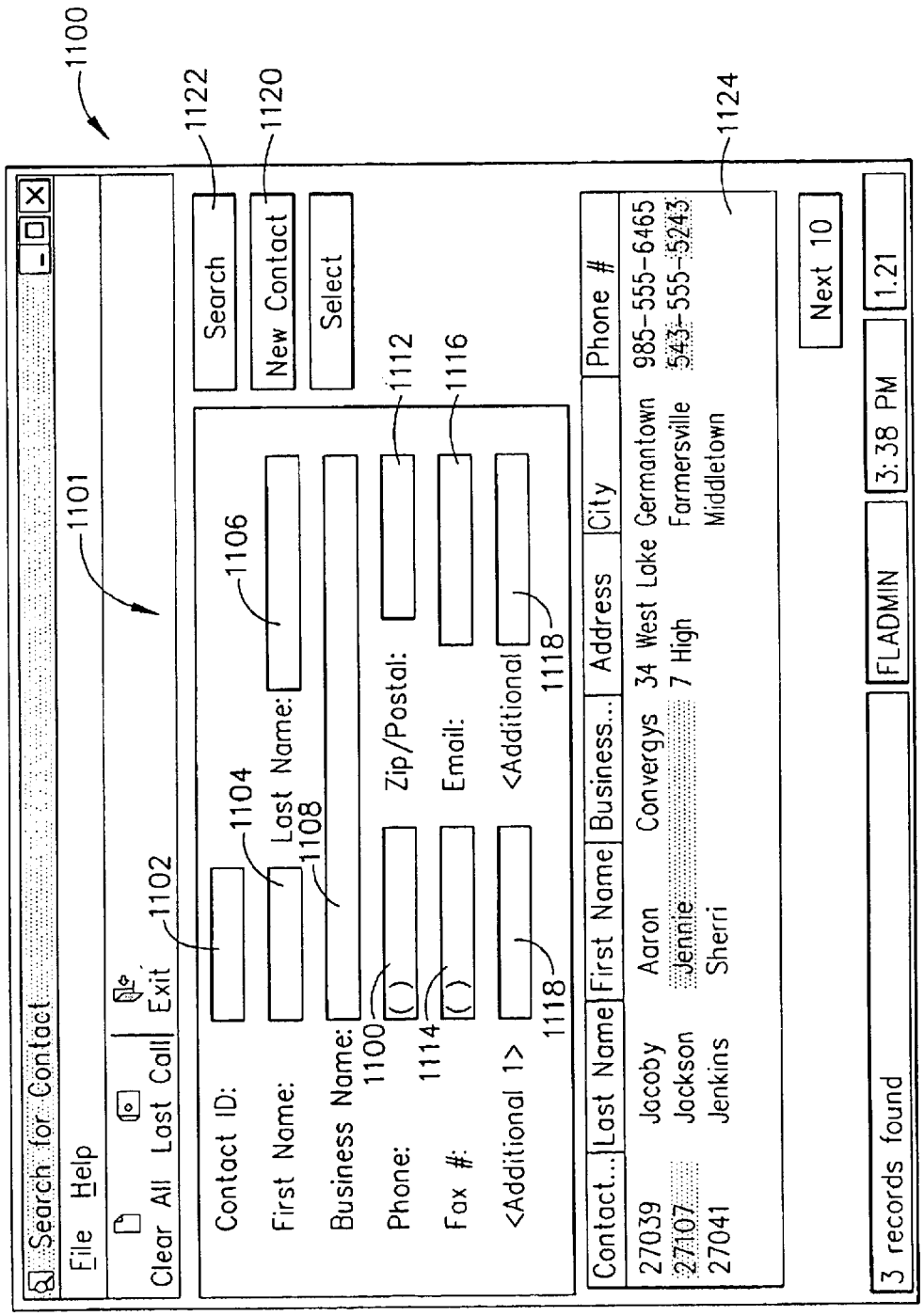
Figure 12:
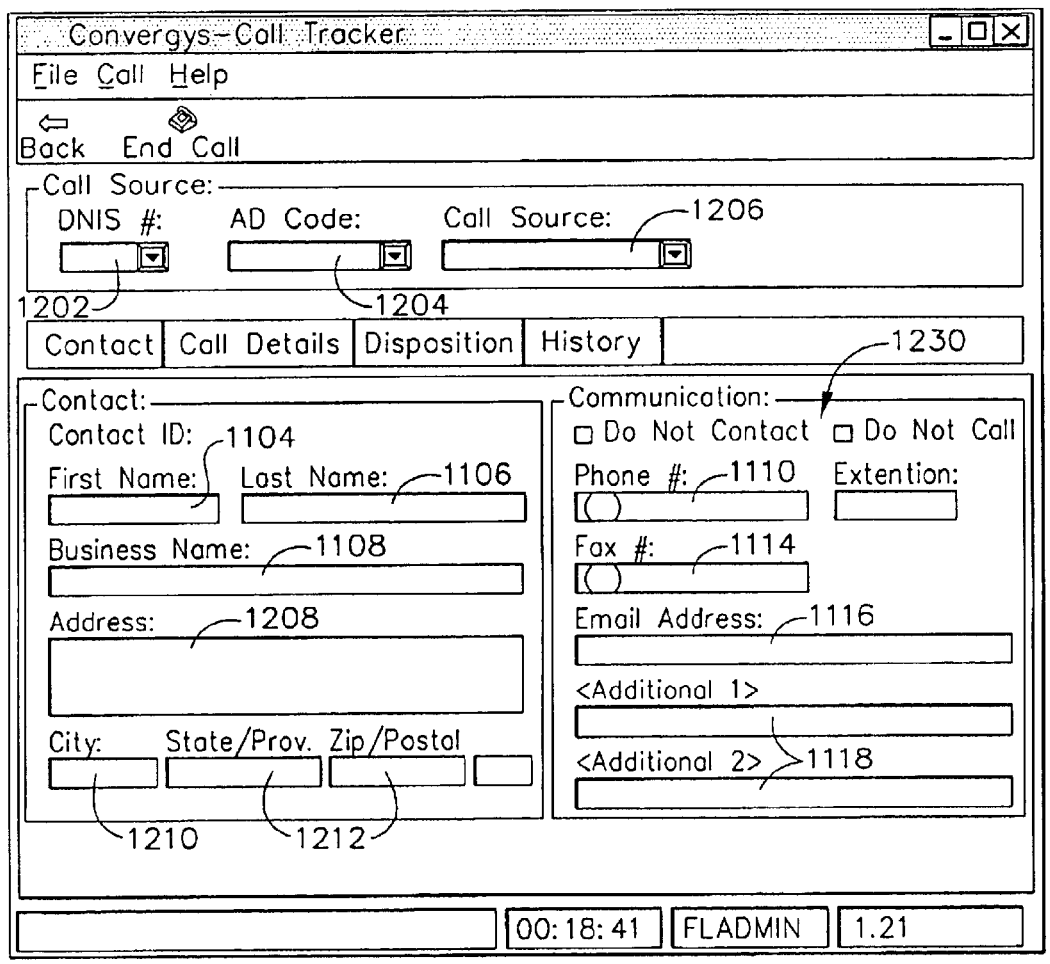

FIGS. 11 through 17 are computer screen shots of an exemplary graphical user interface (GUI) suitable for use in the present invention. FIG. 11 illustrates an exemplary search screen 1100 that can be used by an agent to search prior contact history information as described above. Search screen 1100 provides a plurality of data entry fields 1101 that allow an agent to enter information regarding a customer, such as, contact ID 1102, first name 1104, last name 1106, business name 1108, phone number 1110, zip code 1112, fax number 1114, e-mail address 1116, or other additional identifying information 1118. A New Contact button 1120 is provided and, if selected by the agent, causes a screen similar to the one shown in FIG. 12 (see below) to be displayed on the agent's computer screen. A Search button 1122 is also provided and, if selected by the agent, causes a search to be performed based on the criteria entered into data entry fields 1101 of search screen 1100. Once a search is performed, and if there are any matching records, an information field 1124 displays corresponding information about the customers having matching information to that entered by the agent. By selecting one of the customers listed in information field 1124 by, for example, double-clicking on the customer name using a mouse or other suitable device, a screen similar to the screen shown in FIG. 12 is displayed on the agent's screen with the information from the selected customer entered into the appropriate fields (see FIG. 12 below).

FIG. 12 illustrates a screen that identifies a particular customer by providing a plurality of information to the agent, including, but not limited to, the following: DNIS# 1202; AD Code 1204; call source 1206; first name 1104; last name 1106; business name 1108; address 1208; city 1210; state 1212; zip code 1112; phone number 1110; fax number 1114; e-mail address 1116; or additional identifying information 1118. In addition, a field 1230 is provided to indicate the customer's preference regarding whether they wish to be contacted by an agent.

Figure 13:
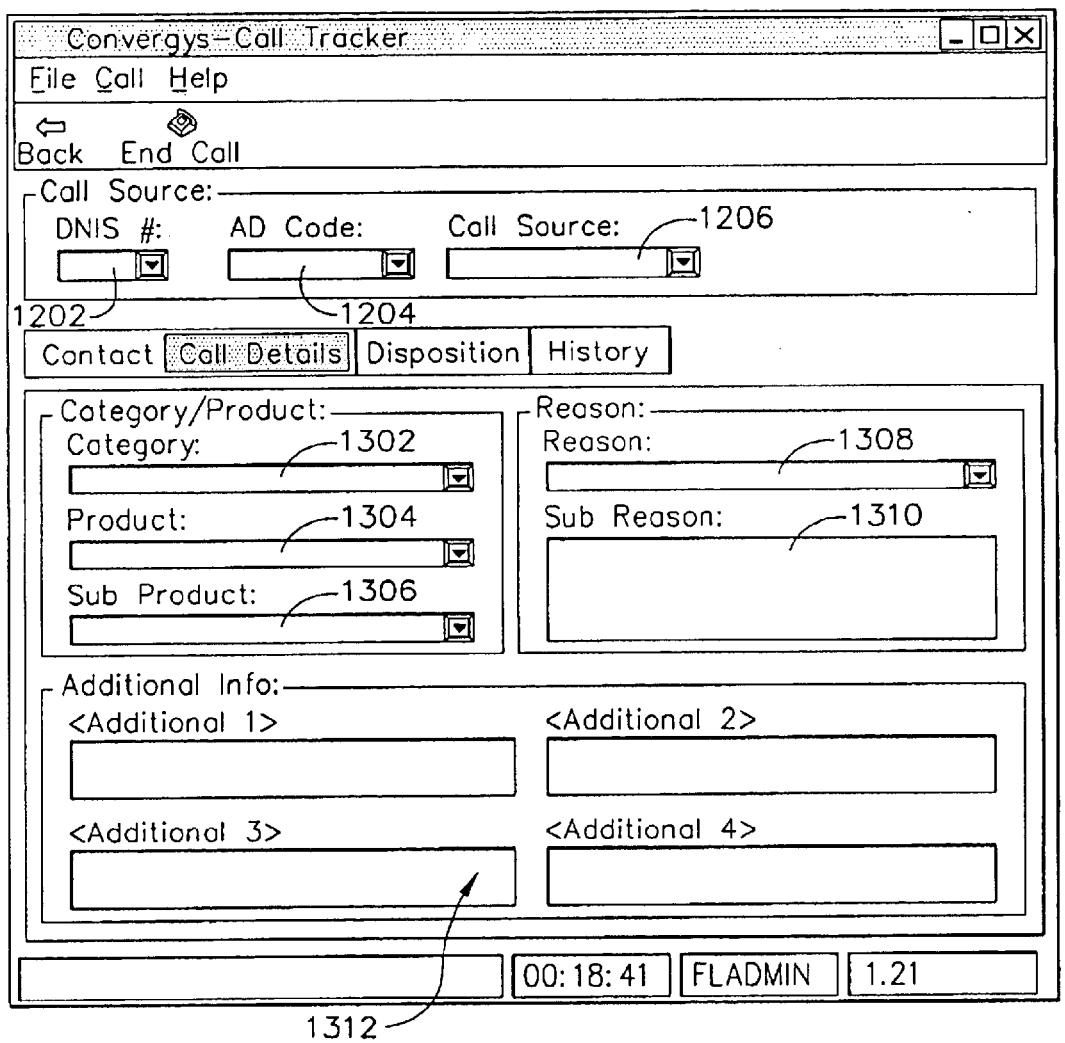

FIG. 13 illustrates a screen that enables the agent to update tracking database 128a with information about the category 1302, product 1304, sub product 1306, reason 1308; sub reason 1310; or other additional information 1312 about a particular customer contact. As can be seen in FIG. 13, the DNIS# 1202, AD Code 1204, and call source 1206 are also provided for quick reference to the particular contact or customer.

Figure 14:
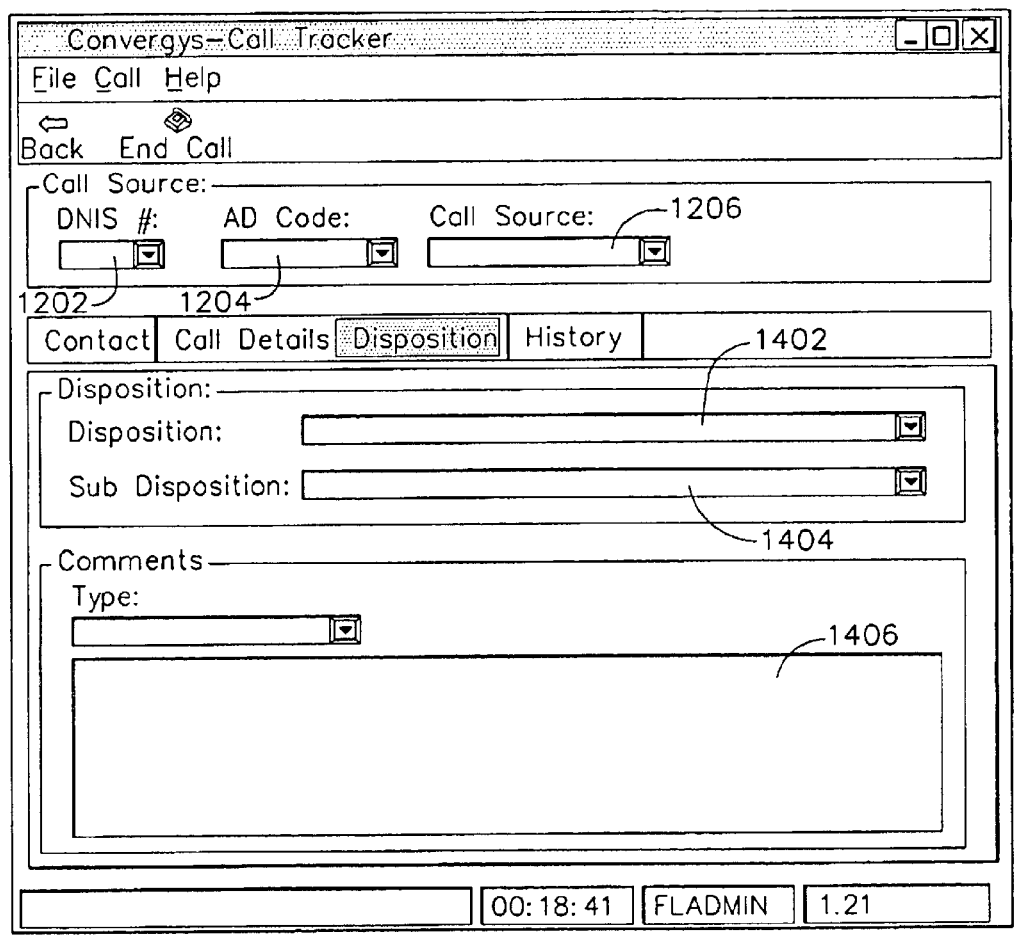

FIG. 14 illustrates a screen that allows the agent to update tracking database 128a with information about the disposition 1402, subdisposition 1404, or other comments 1406 about a contact. Again, the DNIS# 1202, AD Code 1204, and call source 1206 are provided for quick reference to the particular contact or customer.

Figure 15:
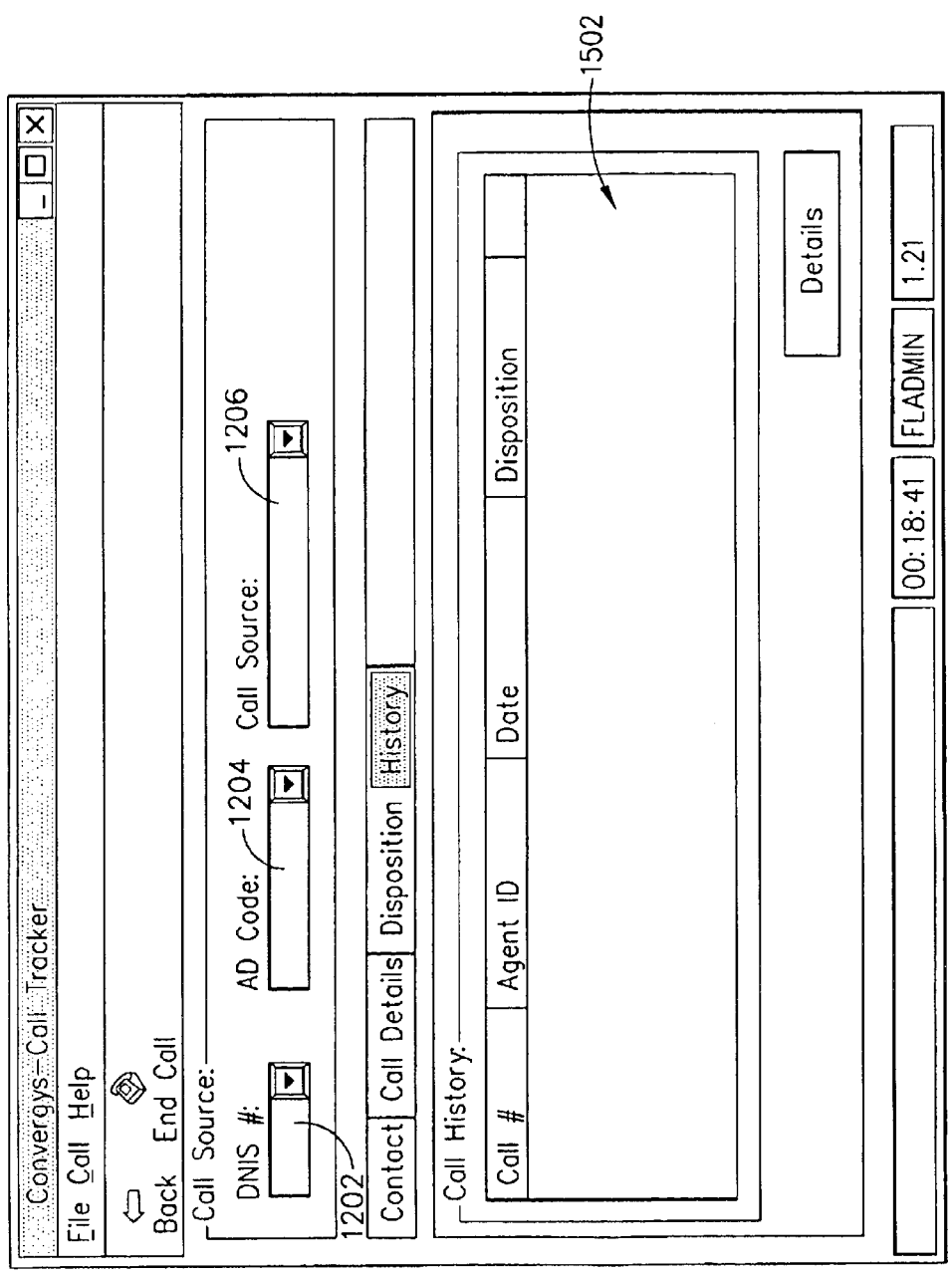

The exemplary screen of FIG. 15 preferably provides a contact history area 1502 showing the contact history of a particular customer. In FIG. 15, contact history area 1502 is referred to as call history area 1502 for a particular customer, but it should be understood by one of ordinary skill in the art that a plurality of information could be included in the contact history including, but not limited to; contacts emanating from e-mail, phone, the Internet and hard copy correspondence.

Figure 16:
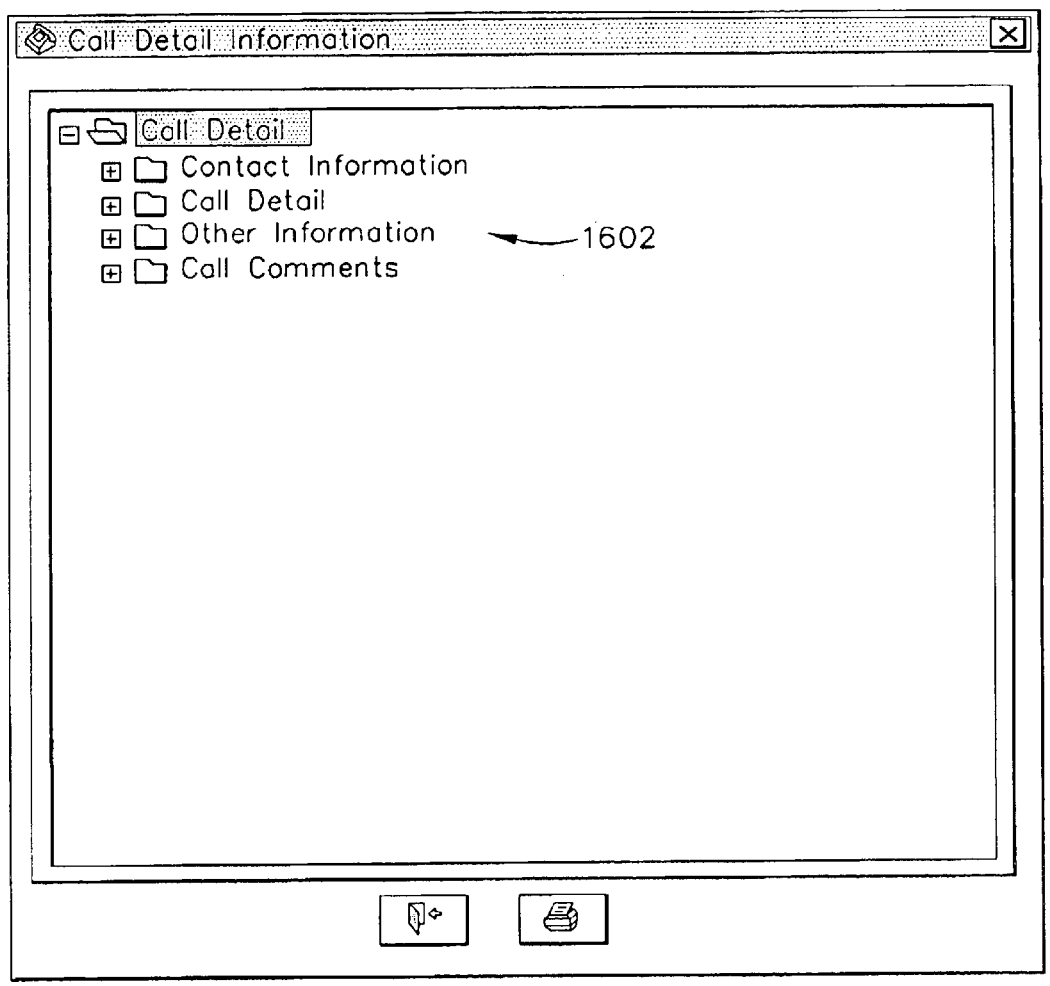

FIG. 16 illustrates a screen that enables an agent to select a particular type of contact detail information 1602, or call detail information as explicitly shown in FIG. 16, in tracking database 128a. It should be apparent to one having ordinary skill in the art that such contact information can comprise data gathered from contacts from e-mail, phone, the Internet, and hard copy correspondence.

Figure 17:
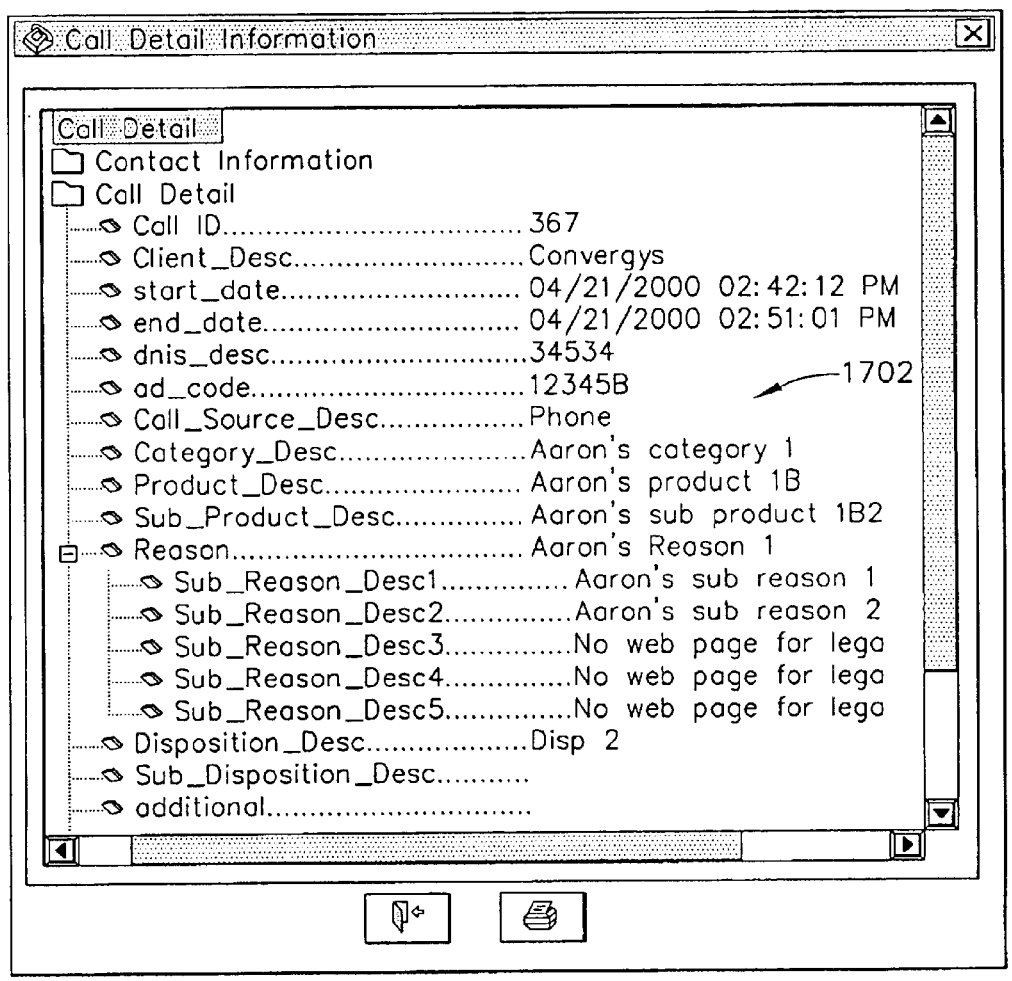

FIG. 17 is an exemplary screen showing telephone call detail information 1702 about a particular contact. It should be apparent to one of ordinary skill in the art that a plurality of information could be illustrated on a screen similar to that shown in FIG. 17 and such a screen could include information obtained from other contacts, such as e-mail, the Internet, or hard copy correspondence.

Figure 18:
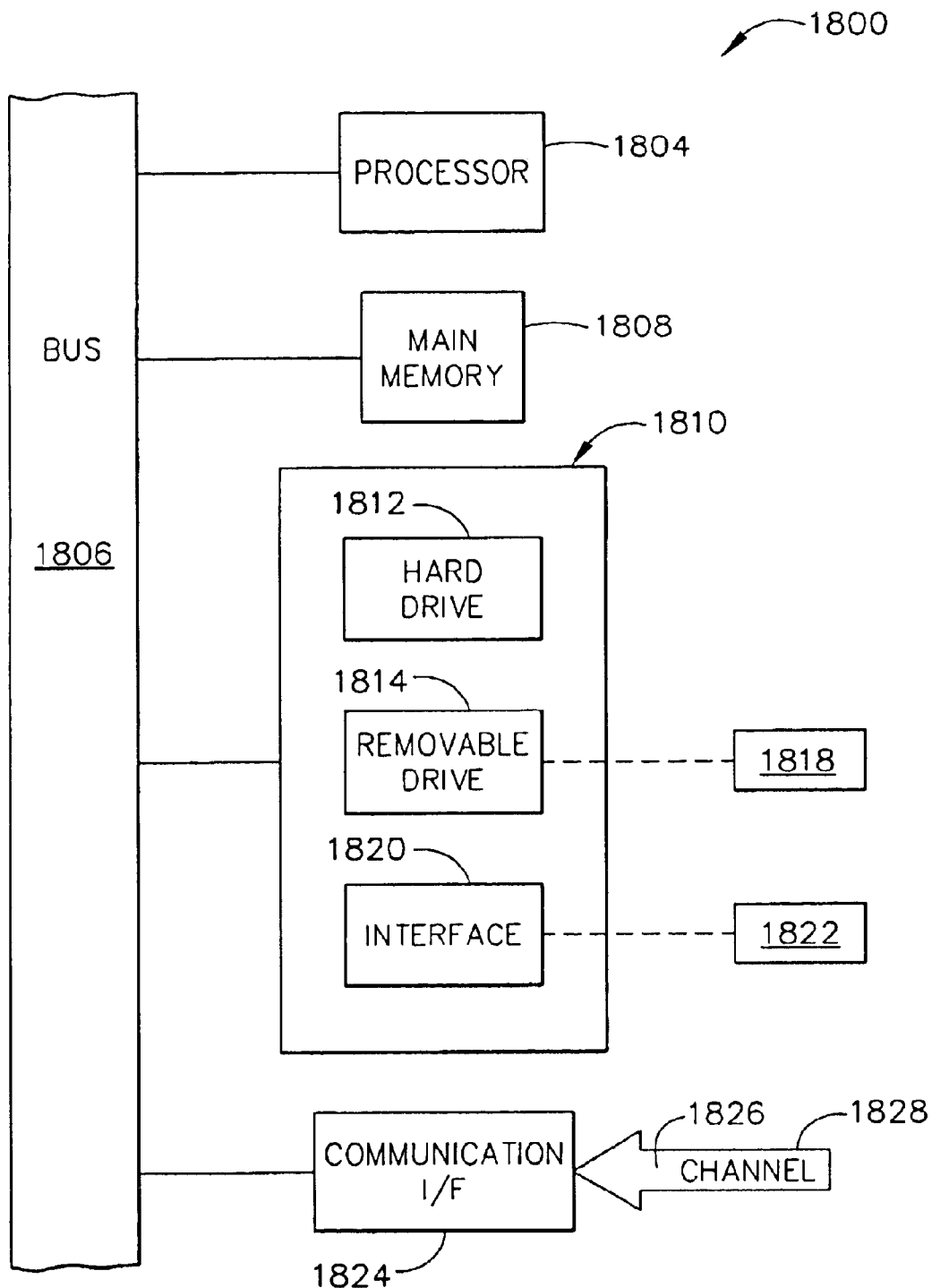
FIG. 18 is a diagram of an exemplary computer system suitable for use in the present invention.

A computer system capable of carrying out the functionality described herein is shown in more detail in FIG. 18. Computer system 1800 includes one or more processors, such as processor 1804. Processor 1804 is connected to a communication bus 1806. Various software embodiments are described in terms of this exemplary computer system. After reading this description, it will become apparent to a person skilled in the relevant art how to implement the invention using other computer systems and/or computer architectures.

Computer system 1800 also includes a main memory 1808, preferably random access memory (RAM), and can also include a secondary memory 1810. Secondary memory 1810 can include, for example, a hard disk drive 1812 and/or a removable storage drive 1814, representing a floppy disk drive, a magnetic tape drive, an optical disk drive, etc. Removable storage drive 1814 reads from and/or writes to a removable storage unit 1818 in a well known manner. Removable storage unit 1818, represents a floppy disk, magnetic tape, optical disk, etc. which is read by and written to by removable storage drive 1814. As will be appreciated, removable storage unit 1818 includes a computer usable storage medium having stored therein computer software and/or data.

In alternative embodiments, secondary memory 1810 may include other similar means for allowing computer programs or other instructions to be loaded into computer system 1800. Such means can include, for example, a removable storage unit 1822 and an interface 1820. Examples of such can include a program cartridge and cartridge interface (such as that found in video game devices), a removable memory chip (such as an EPROM, or PROM) and associated socket, and other removable storage units 1822 and interfaces 1820 which allow software and data to be transferred from removable storage unit 1822 to computer system 1800.

Computer system 1800 can also include a communications interface 1824. Communications interface 1824 allows software and data to be transferred between computer system 1800 and external devices. Examples of communications interface 1824 can include a modem, a network interface (such as an Ethernet card), a communications port, a PCMCIA slot and card, etc. Software and data transferred via communications interface 1824 are in the form of signals 1826 that can be electronic, electromagnetic, optical or other signals capable of being received by communications interface 1824. Signals 1826 are provided to communications interface via a channel 1828. Channel 1828 carries signals 1826 and can be implemented using wire or cable, fiber optics, a phone line, a cellular phone link, an RF link and other communications channels.

In this document, the terms "computer program medium" and "computer usable medium" are used to generally refer to media such as removed storage device 1818, a hard disk installed in hard disk drive 1812, and signals 1826. These computer program products are means for providing software to computer system 1800.

Computer programs (also called computer control logic) are stored in main memory 1808 and/or secondary memory 1810. Computer programs can also be received via communications interface 1824. Such computer programs, when executed, enable computer system 1800 to perform the features of the present invention as discussed herein. In particular, the computer programs, when executed, enable processor 1804 to perform the features of the present invention. Accordingly, such computer programs represent controllers of computer system 1800.

In an embodiment where the invention is implemented using software, the software may be stored in a computer program product and loaded into computer system 1800 using removable storage drive 1814, hard drive 1812 or communications interface 1824. The control logic (software), when executed by processor 1804, causes processor 1804 to perform the functions of the invention as described herein.

In another embodiment, the invention is implemented primarily in hardware using, for example, hardware components such as application specific integrated circuits (ASICs). Implementation of such a hardware state machine so as to perform the functions described herein will be apparent to persons skilled in the relevant art(s). In yet another embodiment, the invention is implemented using a combination of both hardware and software.

Figure 19:
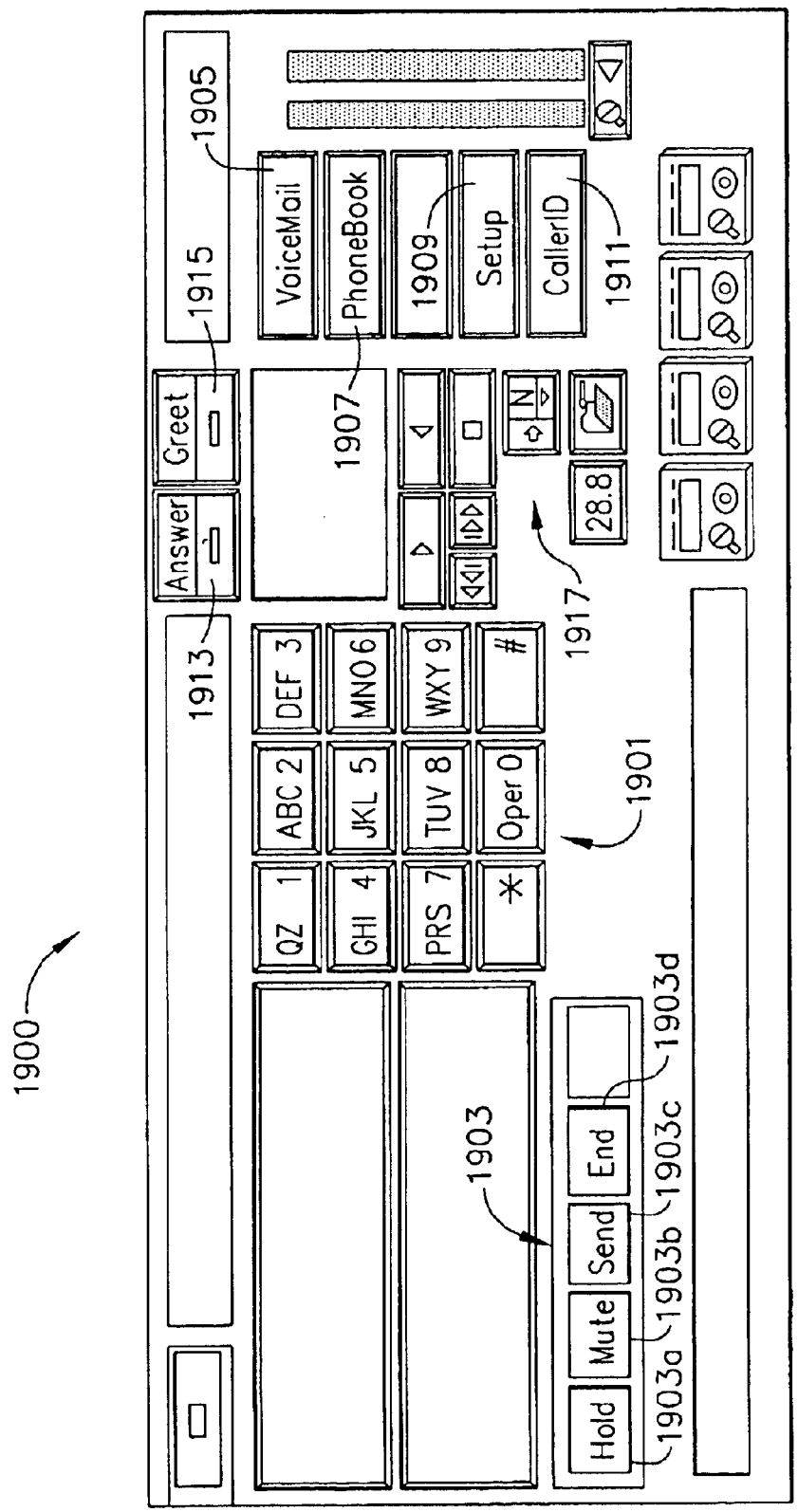
FIG. 19 illustrates an exemplary graphical user interface suitable for controlling an agent telephone in the present invention.

Referring to FIG. 19, there is shown an exemplary graphical user interface 1900 which is preferably included as part of a computer program residing on agent computer 50. Graphical user interface 1900 is configured to enable the agent to control agent telephone 52 through graphical user interface 1900. Such a graphical user interface 1900 can be referred to as a "Softphone" or "Soft Phone" as is known to one of ordinary skill in the art. In the exemplary graphical user interface 1900 shown in FIG. 19, an agent can perform a plurality of tasks directly from agent computer or terminal 50 without the need to perform the tasks via a separate agent telephone 52. Graphical user interface 1900 includes a conventional keypad 1901 which preferably functions in a similar manner to a conventional telephone key pad. In addition, graphical user interface 1900 preferably includes a plurality of function keys 1903 which enable the agent to place a call on hold 1903a, mute the call 1903b, send the call to another agent or other system 1903c, or end the call 1903d. Moreover, the graphical user interface 1900 preferably includes a plurality of other features, including, but not limited to, Voice-mail 1905, which enables the agent to set up and initialize a voice mail feature, PhoneBook 1907, which enables the agent to link to an electronic phone book, Setup 1909, which enables the agent to personalize the graphical user interface 1900, and CallerId 1911, which enables the agent to choose to enable a CallerId functionality. Various other features may also be included in graphical user interface 1900, such as answer 1913 and greet 1915, and other file content management features 1917, which are well within the knowledge of one of ordinary skill in the art.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A system for handling calls to a call center comprising:
   a memory device having embodied therein program code; and
   a processor in communication with said memory device, said processor configured by said program code for:
      placing an agent terminal and an agent telephone in an operating mode which is a not ready to receive a new call mode or a ready to receive a new call mode, the not ready to receive a new call mode comprising at least two of:
         contact presently ongoing mode,
         standby during data entry mode, and
         away from the agent telephone mode;
      routing a new call to the agent terminal and the agent telephone only when the agent terminal and the agent telephone are in the ready to receive a new call mode; and
      displaying information regarding the new call on the agent terminal.

2. A computer program product comprising a computer useable medium having computer program logic recorded thereon for enabling a processor in a computer system to manage a plurality of calls to a call center, said computer program logic comprising:
   placing means for enabling the processor to place an agent terminal and an agent telephone in an operating mode which is a not ready to receive a new call mode or a ready to receive a new call mode, the not ready to receive a new call mode comprising at least two of:
      contact presently ongoing mode,
      standby during data entry mode, and
      away from the agent telephone mode;
   routing means for enabling the processor to route a new call to the agent terminal and the agent telephone only when the agent terminal and the agent telephone are in the ready to receive a new call mode; and
   displaying means for enabling the processor to display information regarding the new call on the agent terminal.

3. A method for reporting contact information obtained from at least two types of customer contact channels, the method comprising:
   collecting customer contact information received through at least two of the Internet, telephone, e-mail, or hard copy correspondence to produce collected contact information;
   automatically storing the collected contact information;
   enabling a client system to query the collected contact information; and
   generating a report based on the collected contact information.

4. A method according to claim 3, wherein in said enabling step, the client system is enabled to query the collected contact information via a public computer network.

5. A method according to claim 3, wherein in said generating step, the report is automatically generated based on a predetermined set of parameters.

6. A method according to claim 3, further comprising:
   enabling the client system to set a parameter of the report.

7. A method according to claim 3, further comprising:
   enabling the client system to select a delivery method of the report.

8. A system for reporting contact information obtained from at least two types of customer contact channels comprising:
   a memory device having embodied therein program code; and
   a processor in communication with said memory device, said processor configured by said program code for:
      collecting customer contact information received through at least two of the Internet, telephone, e-mail, or hard copy correspondence to produce collected contact information;
      automatically storing the collected contact information;
      enabling a client system to query the collected contact information; and
      generating a report based on the collected contact information.

9. A computer program product comprising a computer useable medium having computer program logic recorded thereon for reporting contact information obtained from at least two types of customer contact channels, said computer program logic comprising:
   collecting means for enabling a processor to collect customer contact information received through at least two of the Internet, telephone, e-mail, or hard copy correspondence to produce collected contact information;
   automatically storing means for enabling the processor to automatically store the collected contact information;
   enabling means for enabling the processor to enable a client system to query the collected contact information; and
   generating means for enabling the processor to generate a report based on the collected contact information.

10. A method for reporting customer contact information from a plurality of customer contact channels, the method comprising:
    accumulating customer contact information received from a plurality of customer contact channels, said contact channels comprising the Internet, telephone, e-mail, or hard copy correspondence;
    arranging the customer contact information into a predetermined format to produce formatted customer contact information;
    storing the formatted customer contact information in a first memory storage area; and
    extracting the formatted customer contact information from the first memory storage area to produce extracted customer contact information.

11. A method according to claim 10, further comprising:
    generating a report based on the formatted customer contact information in the first memory storage area.

12. A method according to claim 11, wherein in said generating step, the report is generated automatically based on a set of predetermined factors.

13. A method according to claim 10, further comprising:
    transferring the extracted customer contact information from the first memory storage area to a second memory storage area.

14. A method according to claim 13, further comprising:

generating a report based on the extracted customer contact information in the second memory storage area.

15. A method according to claim 14, wherein in said generating step, the report is generated automatically based on a set of predetermined factors.

16. A method according to claim 13, further comprising:

enabling a client system to generate a customized report based on a set of parameters chosen by the client system, wherein the client system is in data communication with the second memory storage area.

17. A system for reporting customer contact information from a plurality of customer contact channels comprising:

a memory device having embodied therein information relating to customer contact information; and a processor in communication with said memory device, said processor configured for:

accumulating customer contact information received from a plurality of customer contact channels, said contact channels comprising the Internet, telephone, e-mail, or hard copy correspondence to produce accumulated customer contact information;

arranging the accumulated customer contact information into a predetermined format to produce formatted customer contact information;

storing the formatted customer contact information in a first memory storage area; and extracting the formatted customer contact information from the first memory storage area to produce extracted customer contact information.

18. A computer program product comprising a computer useable medium having computer program logic recorded thereon for reporting customer contact information from a plurality of customer contact channels, said computer program logic comprising:

accumulating means for enabling the processor to accumulate customer contact information received through a plurality of customer contact channel, said contact channels comprising the Internet, telephone, e-mail, or hard copy correspondence to produce accumulated customer contact information;

arranging means for enabling the processor to arrange the accumulated customer contact information in a predetermined format to produce formatted customer contact information;

transferring means for enabling the processor to transfer the formatted customer contact information to a first memory storage area; and extracting means for enabling the processor to extract the customer contact information from the first memory storage area to produce extracted customer contact formation.

* * * * *